(12) United States Patent
Zou et al.

(10) Patent No.: US 12,218,413 B2
(45) Date of Patent: *Feb. 4, 2025

(54) MICROWAVE-DOPPLER DETECTING MODULE AND DEVICE THEREOF

(71) Applicant: Shenzhen Merrytek Technology Co., Ltd., Shenzhen (CN)

(72) Inventors: Gaodi Zou, Shenzhen (CN); Xin Zou, Shenzhen (CN)

(73) Assignee: Shenzhen Merrytek Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,359

(22) Filed: Aug. 8, 2023

(65) Prior Publication Data

US 2024/0039147 A1    Feb. 1, 2024

Related U.S. Application Data

(63) Continuation of application No. 17/060,076, filed on Oct. 1, 2020, now Pat. No. 11,764,461.

(51) Int. Cl.
  *H01Q 9/26* (2006.01)
  *H01Q 1/24* (2006.01)
  *H01Q 1/28* (2006.01)
(52) U.S. Cl.
  CPC ............ *H01Q 1/285* (2013.01); *H01Q 1/247* (2013.01); *H01Q 9/26* (2013.01)

(58) Field of Classification Search
  CPC .......... H01Q 1/285; H01Q 1/247; H01Q 1/44; H01Q 9/26; H01Q 9/285; H01Q 19/108; H01Q 21/062; G01S 13/58; G01S 13/20; G01S 7/03
  See application file for complete search history.

(56) References Cited

U.S. PATENT DOCUMENTS

| 4,131,896 A | * | 12/1978 | Miller | H01Q 19/06 343/815 |
| 7,688,252 B2 | * | 3/2010 | Voigtlander | H01Q 9/065 342/104 |
| 2017/0271748 A1 | * | 9/2017 | Ku | H01Q 1/243 |
| 2020/0388933 A1 | * | 12/2020 | Chen | H01Q 21/26 |
| 2021/0135343 A1 | * | 5/2021 | Wu | H01Q 21/24 |

* cited by examiner

*Primary Examiner* — Awat M Salih
(74) *Attorney, Agent, or Firm* — David & Raymond Patent Firm; Raymond Y Chan

(57) ABSTRACT

A microwave-doppler detecting module and device thereof are provided, wherein the microwave-doppler detecting module includes an electromagnetic reflecting surface and at least a pair of antithetical dipoles spacingly disposed to the electromagnetic reflecting surface. When the first and second radiating source poles respectively extended from a first and second feed ends of the pair of antithetical dipoles are respectively fed by the same excitation signal feed source at the first feed end and the second feed end, the current and the potential distribution of the first radiating source pole and the second radiating source pole can present an antithetical distribution state and antithetically coupled to the midpoint of the connection of the first feed end and the second feed end, so as to reduce the size requirement of the microwave-doppler detecting module and to avoid detection dead zone from occurring.

20 Claims, 9 Drawing Sheets

MICROWAVE-DOPPLER DETECTING MODULE AND DEVICE THEREOF

CROSS REFERENCE OF RELATED APPLICATION

This application is a Continuation application that claims the benefit of priority under 35 U.S.C. § 120 to a non-provisional application, application Ser. No. 17/060,076, filed Oct. 1, 2020, which is incorporated herewith by reference in its entirety.

BACKGROUND OF THE PRESENT INVENTION

Field of Invention

The present invention relates to the field of microwave-doppler detection and, in particular, to a microwave-doppler detecting module and device thereof.

Description of Related Arts

Microwave detection technologies based on Doppler Effect, are utilized as a critical key in detecting and relating humans and objects and have a unique advantage among the behavior detection and existence detection technologies. It is able to detect moving object without invading individual privacy. Therefore, such technology has a wide-ranging application prospect.

Conventional microwave detection modules, based on the structures of the radiation source, can mainly be divided into microwave detection modules of columnar radiation source structure and microwave detection modules of flat radiation source structure. More specifically, referring to FIGS. 1A and 1B, the structural principles of conventional microwave detection module 10P of columnar radiation source structure and microwave detection module 20P of flat radiation source structure are respectively illustrated. In which, the microwave detection module 10P of columnar radiation source structure comprises a columnar radiation source 11P and a reference ground surface 12P, wherein the reference ground surface 12P has a radiating aperture 121P arranged thereon, wherein the columnar radiation source 11P perpendicularly penetrates the reference ground surface 12P through the radiating aperture 121P and a radiating clearance 1211P is provided between the radiating aperture 121P and the reference ground surface 12P, so that when the columnar radiation source 11P is fed, the columnar radiation source 11P can be coupled with the reference ground surface 12P to form a radiation space 100P from the radiating clearance 1211P with the columnar radiation source 11P as the central axis, wherein the radiation space 100P is the coverage area of the electromagnetic wave radiated by the microwave detection module 10P of columnar radiation source structure, wherein the radiation space 100P is respectively sunken from the central axis at the two ends of the columnar radiation source 11P, rendering detection dead zones. It is understandable that, in actual utilization, such as a vertical detecting application, when the microwave detection module 10P of columnar radiation source structure is mounted on a place such as a suspended ceiling, regular ceiling, shed ceiling, and etc., and is utilized from a vertical direction to perpendicularly detecting downward, the mounting position of the microwave detection module 10P of columnar radiation source structure is usually lowered for reducing or avoiding detection dead zone of the corresponding radiation space 100P from occurring in the space between the ground and the microwave detection module 10P of columnar radiation source structure. In other words, because the microwave detection module 10P of columnar radiation source structure has a detection dead zone, the detecting distance of the microwave detection module 10P of columnar radiation source structure in real utilization is way smaller than the maximum size of the corresponding radiation space 100P in the central axial direction. That is the detecting distance of the microwave detection module 10P of columnar radiation source structure in real utilization is much smaller than the detecting distance according to the scale of the gain thereof. The gain of the conventional microwave detection module 10P of columnar radiation source structure, which is usually about 2 dB, further limits the application of the conventional microwave detection module 10P of columnar radiation source structure in the field of microwave-doppler detection.

Referring to FIG. 1B, the structure and principle of the microwave detection module 20P of flat radiation source structure are illustrated, wherein the microwave detection module 20P of flat radiation source structure includes a flat panel radiation source 21P and a reference ground surface 22P, wherein the flat panel radiation source 21P and the reference ground surface 22P are spacingly arranged and parallel to each other, while a radiating clearance 23P is defined and provided between the flat panel radiation source 21P and the reference ground surface 22P. It is understandable that because, structurally, the columnar radiation source 11P of the microwave detection module 10P of columnar radiation source structure is perpendicular to the reference ground surface 12P, comparing to the microwave detection module 20P of the flat radiation source structure that is close to a flat plate structure, the microwave detection module 10P of columnar radiation source structure is likely to occupy a larger mounting space in an actual installation. As a result, under the current aesthetic trend of pursuing compact and simple appearance, the microwave detection module of flat radiation source structure is more enjoyable and appreciable to its advantages of small volume and relative stabilization.

Nevertheless, in some application scenarios, the microwave detection module 10P of columnar radiation source structure is more advantageous than the microwave detection module 20P of flat radiation source structure. For example, referring to FIG. 2, the application of the microwave detection module 10P of columnar radiation source structure utilized in a LED light board 30P is illustrated, wherein the LED light board 30P has a plurality of LED lights 31P arranged on one side thereof, so as to create a lighting side on the side of the LED light board 30P. It is understandable that, in order to control the illumination of the LED light board 30P based on human activity, conventional microwave detection module is utilized on such LED light board 30P and, according to actual application, effective electromagnetic wave detecting signal should be radiated in the space corresponding to the lighting side of the LED light board 30P. Because current LED light boards 30P are usually made of electric conductive aluminum sheet, in order to avoid the shielding effect of the electric conductive LED light board to the electromagnetic wave detecting signal and from the perspective of the stability of human activity detecting, ideally, the microwave detection module as a human activity detecting component should be disposed on the illumination side of the LED light board 30P. Nevertheless, whether the microwave detection module 10P of columnar radiation source structure or the microwave detection module 20P of flat radiation source structure is utilized, because the corresponding reference ground surface 12P and the minimum value of the area size of the reference ground surface 22P are restricted, the mounting of the microwave detection module 10P of columnar radiation source structure or the microwave detection module 20P of flat radiation source structure on the illumination side of the LED light board 30P will inevitably occupy the mounting sites of part of the LED lights 31P or shade part of the LED lights 31P, rendering dark zone of the light emitted by the LED light board 30P.

Hence, in order to achieve the illumination of the LED light board 30P based on the control of human activity, conventionally it is mainly based on the arrangement from affecting the LED lights 31P. A through hole 32P is formed in the LED light board 30P. Besides, the columnar radiation source 11P of the microwave detection module 10P of columnar radiation source structure is extended from the side of the LED light board 30P opposite to the illumination side through the through hole 32P to pass through the LED light board 30P to the illumination side of the LED light board 30P, so as to conceal the reference ground surface 12P of the microwave detection module 10P of columnar radiation source structure on the side of the LED light board 30P opposite to the illumination side. Therefore, the mounting of the microwave detection module 10P of columnar radiation source structure on the LED light board 30P can avoid occupying the sites of part of the LED lights 31P or shading part of the LED lights 31P, so as to maintain the evenness and uniformity of the light emitted from the LED light board 30P. Nonetheless, in real utilization, due to the limits of the maximum value of the size of the through hole 32P and the minimum value of the thickness of the LED light board 30P, the coupling between the reference ground surface 12P and the columnar radiation source 11P of the microwave detection module 10P of columnar radiation source structure will be blocked by the LED light board 30P. In other words, the corresponding radiation space 100P on the illumination side of the LED light board 30 will be reduced due to the shielding and reflex action of the LED light board 30P. As a result, the stability of the human activity detection of the microwave detection module 10P of columnar radiation source structure utilized on the LED light board 30P is not ideal. In addition, because of the reflex action of the LED light board 30P and the directivity of the bidirectional radiation of the microwave detection module 10P of columnar radiation source structure, the corresponding radiation space 100P at the side opposite to the illumination side of the LED light board 30P will be enhanced. In other words, the radiating energy of the microwave detection module 10P of columnar radiation source structure on the side opposite to the illumination side of the LED light board 30P will be enhanced. As a result, when there is metal object, such as the metal shell of the LED light board 30P, the metal pipeline in the suspended ceiling space, and etc., presenting in the corresponding space of the side opposite to the illumination side of the LED light board 30P, the microwave detection module 10P of columnar radiation source structure is likely to wrongly detect active object due to self-excitation, which therefore affects the experience of the smart control of the LED light board 30P based on detecting human activity.

In other words, contrasting to the microwave detection module 20P of flat radiation source structure, the microwave detection module 10P of columnar radiation source structure can achieve the activity detecting to the space outside of the shielded space through a conceal mounting manner that extends the columnar radiation source 11P from a shielded space corresponding to one side of a metal plate through a through hole to the space outside of the shielded space corresponding to the other side of the metal plate. Unfortunately, its detecting stability is not good enough and it has detection dead zone.

SUMMARY OF THE PRESENT INVENTION

An object of the present invention is to provide a microwave-doppler detecting module and device thereof, wherein the microwave-doppler detecting module is constructed in an antithetically coupling manner so as to have a relatively higher radiation gain and to be capable of avoiding forming detection dead zone.

Another object of the present invention is to provide a microwave-doppler detecting module and device thereof, wherein the microwave-doppler detecting module based on an antithetical coupling structure comprises at least a pair of antithetical dipoles, wherein the pair of the antithetical dipoles comprises a first radiating source pole and a second radiating source pole, wherein the first radiating source pole has a first feed end and is extended from the first feed end as an end, wherein the second radiating source pole has a second feed end and is extended from the second feed end as an end, wherein the first feed end and the second feed end are close to each other, so that when the first radiating source pole and the second radiating source pole are fed by the same source at the first feed end and the second feed end respectively, the first radiating source pole from the first feed end along the first radiating source pole is correspondingly coupled to the corresponding positions of the second radiating source pole from the second feed end along the second radiating source pole, so as to form the antithetical coupling arrangement between the first radiating source pole and the second radiating source pole.

Another object of the present invention is to provide a microwave-doppler detecting module and device thereof, wherein when the first radiating source pole and the second radiating source pole are fed by the same source at the first feed end and the second feed end respectively, the second radiating source pole and the first radiating source pole create a radiation space based on an antithetical coupling manner, wherein the radiation space is the coverage area of the electromagnetic wave radiated by the microwave-doppler detecting module, wherein the radiation space protrudes in the radial direction of the connection of the first feed end and the second feed end so as to avoid forming a detection dead zone in the direction, which facilitates to enhance the detecting stability and applicability of the microwave-doppler detecting module.

Another object of the present invention is to provide a microwave-doppler detecting module and device thereof, wherein the microwave-doppler detecting module further has an electromagnetic reflecting surface, wherein the first radiating source pole and the second radiating source pole are arranged spacingly to the electromagnetic reflecting surface in the space corresponding to the electromagnetic reflecting surface, so as to utilize the reflection characteristic of the electromagnetic reflecting surface relative to the electromagnetic wave to form the directional radiation characteristic of the microwave-doppler detecting module. Therefore, the microwave-doppler detecting module that is construct in an antithetically coupling manner can create the radiation space in a directional manner, so as to be suitable for sensing and detecting object activity in the directional space and to facilitate to avoid the microwave-doppler detecting module from self-activating, which enhances the anti-interference ability of the microwave-doppler detecting module.

Another object of the present invention is to provide a microwave-doppler detecting module and device thereof, wherein the first radiating source pole utilizes the first feed end as an end thereof and the second radiating source pole utilizes the second feed end as an end thereof, so that when the first radiating source pole and the second radiating source pole are fed by the same source at the first feed end and the second feed end respectively, the electric potentials and the electric currents of the first radiating source pole and the second radiating source pole are in an antithetical distribution state and simplified, which facilitates to simplify the data processing of the microwave-doppler detecting module and to enhance the stability of the microwave-doppler detecting module.

Another object of the present invention is to provide a microwave-doppler detecting module and device thereof, wherein based on the antithetical coupling arrangement, the shape and size of the second radiating source pole is corresponding to the shape and size of the first radiating source pole, so that the first radiating source pole and the second radiating source pole are free from the limit of the reference plane by a limited area, which means that the shapes and sizes of the first radiating source pole and the second radiating source pole allow various structural implementations rather than plant structure with restricted area, which facilitates to miniaturize the microwave-doppler detecting module and to enhance the applicability of the microwave-doppler detecting module.

Another object of the present invention is to provide a microwave-doppler detecting module and device thereof, wherein the shape and size of the first radiating source pole and the second radiating source pole are flexible and variable without being limited by the plant structure of restricted area, wherein the microwave-doppler detecting module is also adaptable for the application scenario of the microwave detection module of the above mentioned columnar radiation source structure through extending the first radiating source pole and the second radiating source pole to a corresponding metal plate, wherein comparing to the microwave detection module of columnar radiation source structure, the present microwave-doppler detecting module has better stability in the corresponding application scenario.

Another object of the present invention is to provide a microwave-doppler detecting module and device thereof, wherein by adjusting the shape of the second radiating source pole and the first radiating source pole, such as through bending and etc., the size of the microwave-doppler detecting module can be further reduced while the wire length requirements of the second radiating source pole from the second feed end along the second radiating source pole and the first radiating source pole from the first feed end along the first radiating source pole, which, namely, not only ensures the antithetical coupling of the second radiating source pole and the first radiating source pole, but also enhances the applicability of the microwave-doppler detecting module.

Another object of the present invention is to provide a microwave-doppler detecting module and device thereof, wherein by adjusting the shape of the second radiating source pole and the first radiating source pole, such as opposite extending the second radiating source pole and the first radiating source pole from the connection direction of the first feed point and the second feed point and concurrent extending them toward the direction close to the electromagnetic reflecting surface and etc., so as to form and construct conditions that the end of the first radiating source pole opposite to the first feed end is relatively closer to the electromagnetic reflecting surface comparing to the first feed end, and the end of the second radiating source pole opposite to the second feed end is relatively closer to the electromagnetic reflecting surface comparing to the second feed end, wherein the radiation space can correspondingly be adjusted into a condition that the projection thereof in the directional radiation direction is close to a round shape, which facilitates to enhance the applicability of the microwave-doppler detecting module in sensing and detecting of object activities in the directional space in various scenarios.

Another object of the present invention is to provide a microwave-doppler detecting module and device thereof, wherein the first radiating source pole and the second radiating source pole are further grounded, so as to reduce the impedance of the microwave-doppler detecting module, which means that the quality factor (Q value) of the microwave-doppler detecting module is increased, so as to facilitate the anti-interference ability of the microwave-doppler detecting module.

Another object of the present invention is to provide a microwave-doppler detecting module and device thereof, wherein the microwave-doppler detecting module further comprises a circuit board and a circuit unit loaded on the circuit board, wherein the circuit unit comprises an oscillation circuit module and a frequency mixing wave detection unit, wherein the first radiating source pole and the second radiating source pole are electrically coupled with different poles of the oscillation circuit module respectively at the first feed end and the second feed end. In which, the frequency mixing wave detection unit is electrically coupled with the oscillation circuit module and the antithetical dipoles, so that when the oscillation circuit module is powered, the first radiating source pole and the second radiating source pole are fed by the same source of the oscillation circuit module in a antithetical manner, so as to emit a sounding wave beam in a coupling manner and receive an echo of the sounding wave beam. The frequency mixing wave detection unit outputs an intermediate-frequency signal corresponding to the frequency difference between the sounding wave beam and the echo. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

Another object of the present invention is to provide a microwave-doppler detecting module and device thereof, wherein the electromagnetic reflecting surface is loaded on a side of the circuit board opposite to the side loading the circuit unit, which means that the electromagnetic reflecting surface faces toward the antithetical dipoles and obstructs between the circuit unit and the antithetical dipoles, so as to utilize the electromagnetic radiation reflection characteristic of the electromagnetic reflecting surface to obstruct the electromagnetic radiation produced by the coupling of the first radiating source pole and the second radiating source pole from interfering the circuit unit, which facilitates to enhance the anti-interference ability of the microwave-doppler detecting module.

Another object of the present invention is to provide a microwave-doppler detecting module and device thereof, wherein the microwave-doppler detecting module further comprises a first feeder wire and a second feeder wire, wherein the first radiating source pole is electrically coupled with the oscillation circuit module at the first feed end through the first feeder wire, wherein the second radiating source pole is electrically connected with the earth potential of the oscillation circuit module at the second feed end through the second feeder wire, so as to form and create a circuit connection relation that the first radiating source pole and the second radiating source pole are respectively electrically coupled with different poles of the oscillation circuit module at the first feed end and the second feed end respectively and to form and create a structural relation that utilizes the supports of the first feeder wire and the second feeder wire to the first radiating source pole and the second radiating source pole to arrange the antithetical dipoles spacingly to the electromagnetic reflecting surface in the space corresponding to the electromagnetic reflecting surface.

Another object of the present invention is to provide a microwave-doppler detecting module and device thereof, wherein the second feeder wire encircles the first feeder wire so as to form and create an electromagnetic shielding cavity, such that when the second feeder wire is grounded, the influence of the coupling between the second feeder wire and the first feeder wire to the coupling between the first radiating source pole and the second radiating source pole can be reduced and the interference of external electromagnetic radiation to the first feeder wire can be shielded, which facilitates to enhance the anti-interference ability of the microwave-doppler detecting module.

Another object of the present invention is to provide a microwave-doppler detecting module and device thereof, wherein the microwave-doppler detecting device comprises the microwave-doppler detecting module and have and an electromagnetic shielding layer, wherein the electromagnetic shielding layer has a through hole, wherein the circuit board is disposed in a shielded space corresponding to a side of the electromagnetic shielding layer, wherein the first radiating source pole and the second radiating source pole are disposed in another space corresponding to another side of the electromagnetic shielding layer, wherein the first feeder wire and the second feeder wire pass through the electromagnetic shielding layer through the through hole to form and construct the circuit connection structure among the first radiating source pole and the second radiating source pole and the circuit unit, so as to utilize the arrangement of the first radiating source pole and the second radiating source pole in a space outside of the shielded space to perform the activity sensing and detecting for the space outside of the shielded space. In which, thanks to the way of the antithetical coupling of the first radiating source pole and the second radiating source pole, the projected area of the first radiating source pole and the second radiating source pole in the direction perpendicular to the electromagnetic shielding layer can be reduced, which facilitates the stealth of the mounting of the microwave-doppler detecting device in the microwave-doppler detecting device and avoids a LED light board from creating a dark zone when the electromagnetic shielding layer is provided on the LED light board.

Another object of the present invention is to provide a microwave-doppler detecting module and device thereof, wherein the microwave-doppler detecting module is able to avoid detection dead zone based on the antithetical coupling arrangement thereof, that arrangement also reduces the size requirement of the microwave-doppler detecting module, which also facilitate to enhance the stealth and detecting stability of the microwave-doppler detecting module mounted in the microwave-doppler detecting device.

According to an aspect of the present invention, the present invention provides a microwave-doppler detecting module, which includes:

at least one pair of antithetical dipoles, wherein each pair of the antithetical dipoles comprises a first radiating source pole and a second radiating source pole, wherein the first radiating source pole has a first feed end and is disposed to be a conductor extended from the first feed end as an end thereof, wherein the second radiating source pole has a second feed end and is disposed to be a conductor extended from the second feed end as an end thereof, wherein the first radiating source pole and the second radiating source pole are adapted for being fed by the same excitation signal feed source at the first feed end and the second feed end respectively, wherein the first feed end and the second feed end approach each other within a range smaller than or equal to $\lambda/32$, wherein $\lambda$ is the wavelength parameter corresponding to the feed signal frequency of the excitation signal feed source, wherein the first radiating source pole is configured to satisfy to have a wire length greater than or equal to $\lambda/16$ from the first feed end, wherein the second radiating source pole is configured to satisfy to have a wire length greater than or equal to $\lambda/16$ from the second feed end, so as to allow the current and potential distribution of the first radiating source pole and the second radiating source pole to be presented in an antithetical distribution state to the midpoint of the connection of the first feed end and the second feed end when the first radiating source pole and the second radiating source pole are fed by the same excitation signal feed source at the first feed end and the second feed end respectively, so as to correspondingly couple the first radiating source pole from the first feed end along the first radiating source pole with the corresponding positions of the second radiating source pole from the second feed end along the second radiating source pole; and an electromagnetic reflecting surface, wherein the antithetical dipoles are arranged spacingly to the electromagnetic reflecting surface in the space corresponding to the electromagnetic reflecting surface, wherein the distance between the electromagnetic reflecting surface and the midpoint of the connection of the first feed end and the second feed end is greater than or equal to $\lambda/32$ and smaller than or equal to $\lambda/2$.

According to another aspect of the present invention another, the present invention also provides a microwave-doppler detecting device, which includes:

a circuit unit, which comprises an oscillation circuit module and a frequency mixing wave detection unit, wherein the oscillation circuit module is configured to be adapted for being powered to output a feed signal from the feeder pole thereof and being grounded at the grounding pole thereof for being an excitation signal feed source;

a circuit board, wherein the circuit unit is loaded on the circuit board;

an electromagnetic shielding layer, which has a through hole, wherein the circuit unit is arranged in a space corresponding to a side of the electromagnetic shielding layer; and at least one pair of antithetical dipoles, wherein the antithetical dipoles are disposed in a space corresponding to another side of the electromagnetic shielding layer, wherein the pair of antithetical dipoles comprise a first radiating source pole and a second radiating source pole, wherein the first radiating source pole has a first feed end and is disposed to be a conductor extended from the first feed end as an end thereof, wherein the second radiating source pole has a second feed end and is disposed to be a conductor extended from the second feed end as an end thereof, wherein the frequency mixing wave detection unit is electrically coupled with the oscillation circuit module and the antithetical dipoles, wherein the first radiating source pole is electrically coupled with the feeder pole of the oscillation circuit module through a first feeder wire penetrating the electromagnetic shielding layer through the through hole at the first feed end, wherein the second radiating source pole is electrically connected with the grounding pole of the oscillation circuit module through a second feeder wire penetrating the electromagnetic shielding layer through the through hole at the second feed end, wherein the first feed end and the second feed end approach each other within a range smaller than or equal to $\lambda/32$, wherein $\lambda$ is the wavelength parameter corresponding to the frequency of the feed signal, wherein the first radiating source pole is configured to satisfy to have a wire length greater than or equal to $\lambda/16$ from the first feed end, wherein the second radiating source pole is configured to satisfy to have a wire length greater than or equal to $\lambda/16$ from the second feed end, so as to allow the potential distribution of the first radiating source pole and the second radiating source pole to present an antithetical distribution state to the midpoint of the connection of the first feed end and the second feed end, so as to correspondingly couple the first radiating source pole from the first feed end along the first radiating source pole with the corresponding positions of the second radiating source pole from the second feed end along the second radiating source pole.

Still further objects and advantages will become apparent from a consideration of the ensuing description and drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Figure 1A:
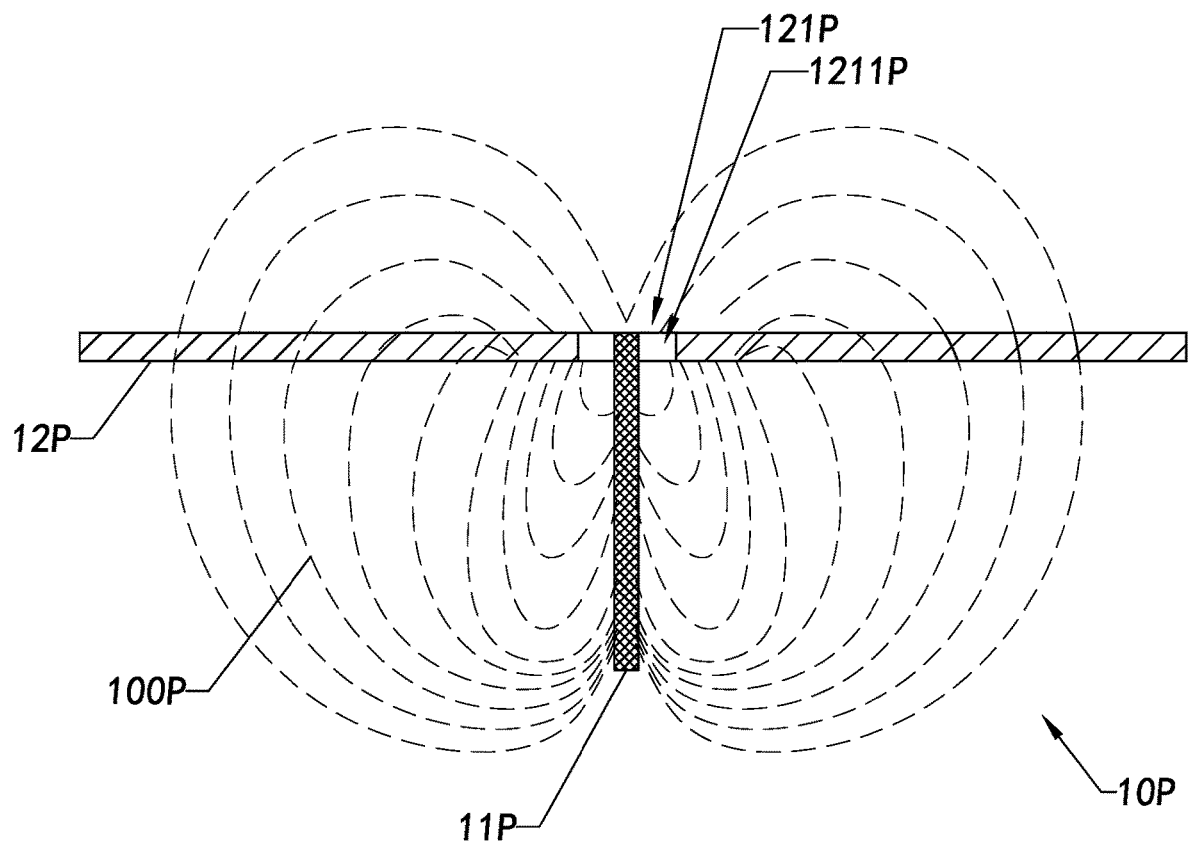
FIG. 1A is a perspective view illustrating the structure and principle of the microwave detection module of the conventional columnar radiation source structure.
Figure 1B:
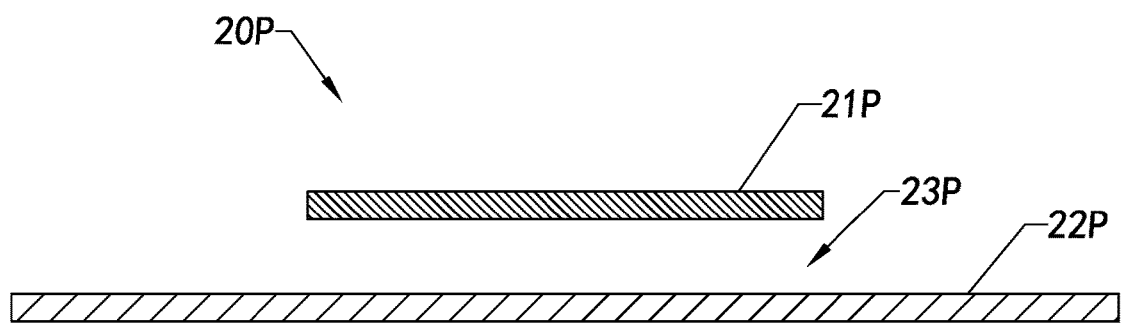
FIG. 1B is a perspective view illustrating the structure and principle of the microwave detection module of the conventional flat radiation source structure.
Figure 2:
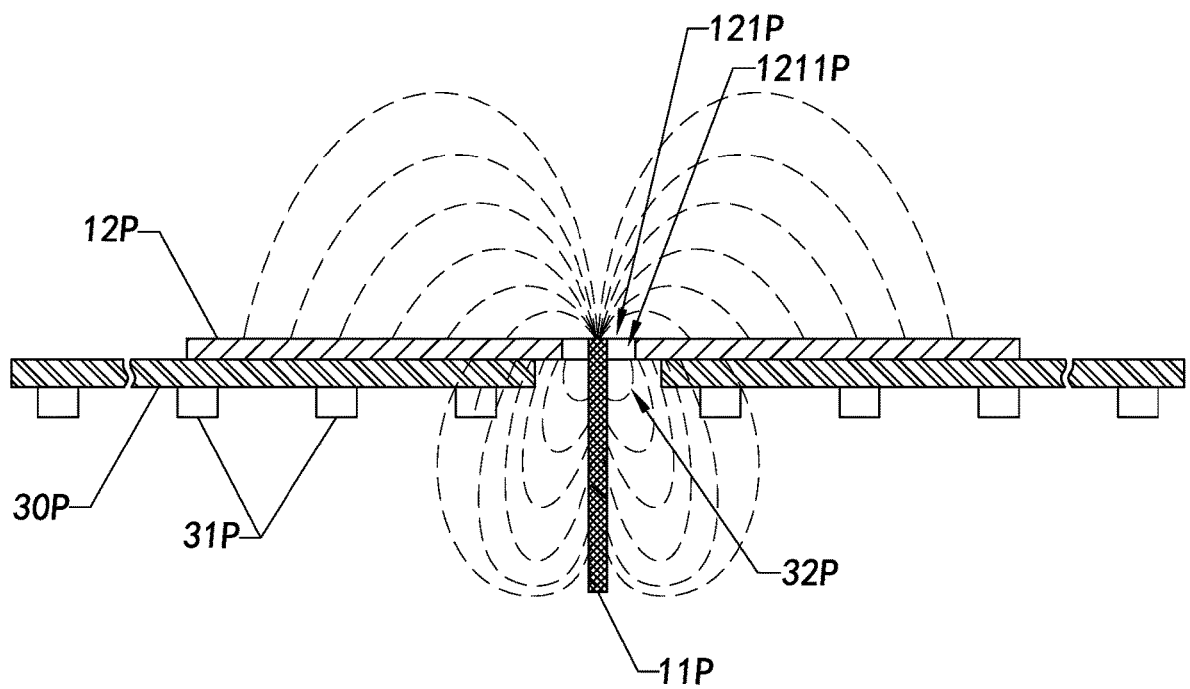
FIG. 2 is a perspective view illustrating the installation structure of the microwave detection module of the conventional columnar radiation source structure mounted on a LED light board.
Figure 3:
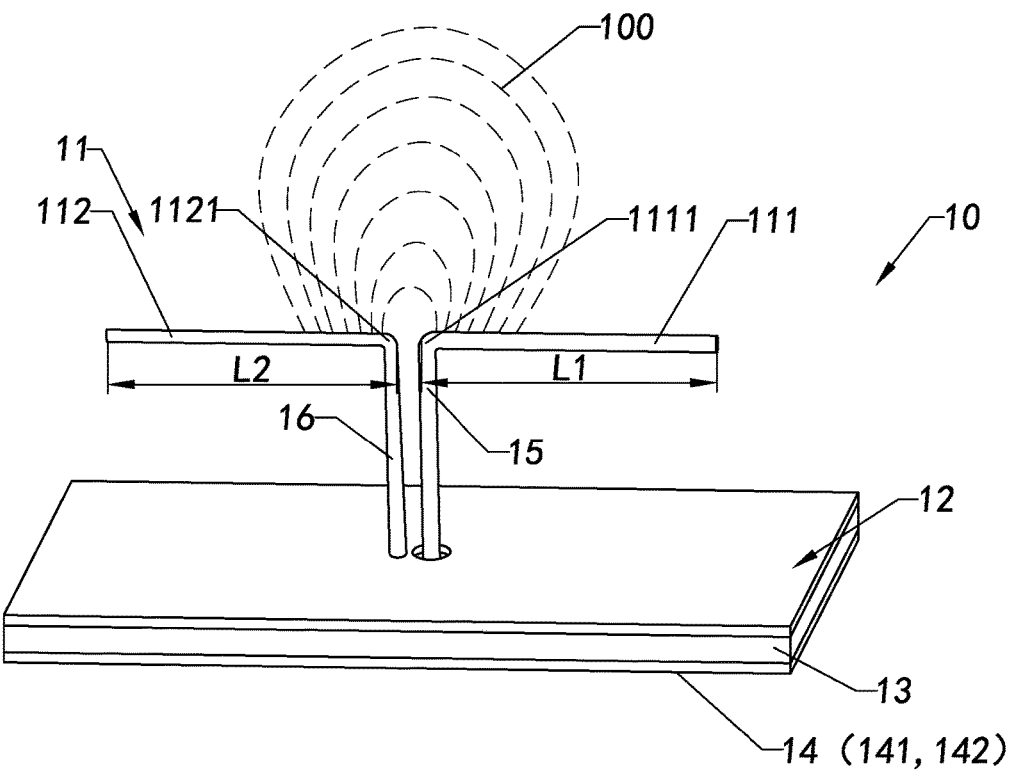
FIG. 3 is a perspective view illustrating a three-dimensional structure of a microwave-doppler detecting module according to a preferred embodiment of the present invention.

Referring to FIG. 3 of the drawings, a 3D structure of a microwave-doppler detecting module 10 according to a preferred embodiment of the present invention is illustrated, wherein the microwave-doppler detecting module 10 comprises at least one pair of antithetical dipoles 11, wherein the pair of the antithetical dipoles 11 comprises a first radiating source pole 111 and a second radiating source pole 112, wherein the second radiating source pole 112 has a second feed end 1121 while the first radiating source pole 111 has a first feed end 1111, wherein the second feed end 1121 and the first feed end 1111 are close to each other, wherein the second radiating source pole 112 is a conductor extended from the second feed end 1121 as an end, while the first radiating source pole 111 is a conductor extended from the first feed end 1111 as an end. In which, the first radiating source pole 111 and the second radiating source pole 112 are configured to be adapted for being fed by the same source at the first feed end 1111 and the second feed end 1121 respectively, wherein the second feed end 1121 and the first feed end 1111 are close to each other and satisfy that a distance between the second feed end 1121 and the first feed end 1111 is smaller than or equal to $\lambda/32$, wherein $\lambda$ is the wavelength parameter corresponding to the feed signal frequency. Accordingly, when the first radiating source pole 111 and the second radiating source pole 112 are fed by the same source at the first feed end 1111 and the second feed end 1121 respectively, the first radiating source pole 111 from the first feed end 1111 along the first radiating source pole 111 is correspondingly coupled to the corresponding positions of the second feed end 1121 of the second radiating source pole 112 along the second radiating source pole 112, so as to form the antithetical coupling arrangement between the first radiating source pole 111 and the second radiating source pole 112.

It is worth mentioning that, based on the antithetical coupling between the first radiating source pole 111 and the second radiating source pole 112, a size requirement for the second radiating source pole 112 and the first radiating source pole 111 to couple with each other can be reduced. Specifically, the second radiating source pole 112 and the first radiating source pole 111 are configured to satisfy that the wire lengths respectively from the second feed end 1121 and the first feed end 1111 are greater than or equal to $\lambda/16$. In other words, the first radiating source pole 111 is configured to satisfy that the first feed end 1111 and the end opposite to the first feed end 1111 has a wire length therebetween greater than or equal to $\lambda/16$, wherein the second radiating source pole 112 is configured to satisfy that the second feed end 1121 and the end opposite to the second feed end 1121 has a wire length therebetween greater than or equal to $\lambda/16$. In other words, the first radiating source pole 111 and the second radiating source pole 112 allow a minimum wire length of $\lambda/16$ from the first feed end 1111 and the second feed end 1121.

Preferably, the distance between the second feed end 1121 and the first feed end 1111 is close to $\lambda/128$, so as to reduce the depletion in the coupling between the first radiating source pole 111 and the second radiating source pole 112 and correspondingly enhance the gain of the microwave-doppler detecting module 10.

In particular, according to the disclosure of the preferred embodiment of the present invention, the microwave-doppler detecting module 10 is embodied as example to feedably connect the first radiating source pole 111 and the second radiating source pole 112 at the first feed end 1111 and the second feed end 1121 respectively with different poles of the same excitation signal feed source so as to be fed by the same source.

Specifically, according to this embodiment of the present invention, the first radiating source pole 111 is feedably connected with the feeder pole of the excitation signal feed source at the first feed end 1111 and the second radiating source pole 112 is electrically connected with the grounding pole of the excitation signal feed source at the second feed end 1121 so as to be fed by the same source of the excitation signal feed source with the first radiating source pole 111, wherein the first radiating source pole 111 from the first feed end 1111 along the first radiating source pole 111 is correspondingly coupled with the corresponding positions of the second radiating source pole 112 from the second feed end 1121 along the second radiating source pole 112 so as to form and create a radiation space 100, wherein the radiation space 100 is the coverage area of the electromagnetic wave radiated by the microwave-doppler detecting module 10. In which, because the first radiating source pole 111 from the first feed end 1111 along the first radiating source pole 111 is correspondingly coupled with the corresponding positions of the second radiating source pole 112 from the second feed end 1121 along the second radiating source pole 112, so that the radiation space 100 formed through the antithetical coupling manner can protrude in a radial direction of the connection of the first feed end 1111 and the second feed end 1121 so as to avoid forming a detection dead zone in such direction, which facilitates to enhance the detecting stability and applicability of the microwave-doppler detecting module 10.

Further, the microwave-doppler detecting module 10 has an electromagnetic reflecting surface 12, wherein the first radiating source pole 111 and the second radiating source pole 112 are arranged spacingly to the electromagnetic reflecting surface 12 in the space corresponding to the electromagnetic reflecting surface 12, so as to utilize the reflection characteristic of the electromagnetic reflecting surface 12 relative to the electromagnetic wave to form the directional radiation characteristic of the microwave-doppler detecting module 10. Therefore, the microwave-doppler detecting module 10 is suitable for sensing and detecting object activity in the directional space and facilitates to avoid the microwave-doppler detecting module 10 from self-activating, which enhances the anti-interference ability of the microwave-doppler detecting module 10.

In particular, the electromagnetic reflecting surface 12 is configured to satisfy that the distance thereto from the midpoint of the connection of the first feed end 1111 and the second feed end 1121 is greater than or equal to $\lambda/32$ and smaller than or equal to $\lambda/2$ and, preferably, close to $\lambda/4$. Therefore, the reflex action of the electromagnetic reflecting surface 12 for the radiation in the direction from the first radiating source pole 111 and the second radiating source pole 112 to the electromagnetic reflecting surface 12 can be enhanced, so as to facilitate to extent the detecting distance of the microwave-doppler detecting module 10.

Further, based on the structural relations that the first feed end 1111 and the second feed end 1121 close to each other, the first radiating source pole 111 is extended from the first feed end 1111 as an end, and the second radiating source pole 112 is extended from the second feed end 1121 as an end, the first radiating source pole 111 and the second radiating source pole are able to be coupled with each other in an antithetical coupling manner. Correspondingly, the wire length of the second radiating source pole 112 is corresponding to the wire length of the first radiating source pole 111, so that the second radiating source pole 112 is able to be free from the limit of the reference plane of a restricted minimum area, which means that the wire length of the second radiating source pole 112 corresponding to that of the first radiating source pole 111 may have various structural implementations rather than a plane structure with restricted minimum area. That is the structure of the microwave-doppler detecting module 10 is diverse, which facilitates to enhance the applicability of the microwave-doppler detecting module 10.

Specifically, according to this embodiment of the present invention, the wire length of the second radiating source pole 112 corresponding to the first radiating source pole 111 is configured to be a columnar conductive wire, which may be, but not limited to, round columnar conductive wire, square columnar conductive wire, and etc., wherein the wire length parameter L2 of the second radiating source pole 112 defined between the second feed end 1121 and the end opposite to the second feed end 1121 satisfies that $\lambda/16 \leq L2 \leq \lambda$. Correspondingly, wire length parameter L1 defined on the first radiating source pole 111 between the first feed end 1111 and the end opposite to the first feed end 1111 satisfies that $\lambda/16 \leq L1 \leq k$. In this way, the second radiating source pole 112 can be grounded at the second feed end 1121 as an end thereof, so that when the first radiating source pole 111 is fed at the first feed end 1111 as an end thereof, the first radiating source pole 111 and the second radiating source pole 112 can be coupled in an antithetical coupling manner.

Preferably, the second radiating source pole 112 and the first radiating source pole 111 are configured to satisfy that the wire lengths thereof from the second feed end 1121 and the first feed end 1111 respectively are close to $\lambda/4$ within an error range of $\lambda/128$, which means $31\lambda/128 \leq L1 \leq 33\lambda/128$ and $31\lambda/128 \leq L2 \leq 33\lambda/128$. As a result, the first radiating source pole 111 and the second radiating source pole 112 have wire lengths close to $\lambda/2$, which facilitates to enhance the radiation efficiency between the first radiating source pole 111 and the second radiating source pole 112 and correspondingly facilitates to enhance the gain of the microwave-doppler detecting module 10.

Further, according to this embodiment of the present invention, the first radiating source pole 111 and the second radiating source pole 112 are disposed symmetrically to the midpoint of the connection of the first feed end 1111 and the second feed end 1121. Namely, the first radiating source pole 111 and the second radiating source pole 112 have the same shape and size and the positional relation between the first radiating source pole 111 and the second radiating source pole 112 satisfies that the first radiating source pole 111 is able to surround around the midpoint of the connection of the first feed end 1111 and the second feed end 1121 to turn 180 degrees for at least one direction and to be overlapped with the position of the second radiating source pole 112. Accordingly, this facilitates to ensure the coupling between the second radiating source pole 112 and the first radiating source pole 111 in an antithetical manner as well as facilitates to maintain the symmetry of the radiation space 100, which correspondingly maintain the stability of the detection range of the microwave-doppler detecting module 10.

Specifically, according to this embodiment of the present invention, the first radiating source pole 111 and the second radiating source pole 112 being configured to be columnar conductive wires are coaxially arranged. In other words, the first radiating source pole 111 is continually extended from the second feed end 1121 toward the first feed end 1111 and from the first feed end 1111 as an end along the connection of the first feed end 1111 to the second feed end 1121. The second radiating source pole 112 is continually extended from the first feed end 1111 toward the second feed end 1121 and from the second feed end 1121 as an end toward the connection of the first feed end 1111 to the second feed end 1121. Accordingly, the structural relation that the first radiating source pole 111 and the second radiating source pole 112 are disposed symmetrically to the midpoint of the connection of the first feed end 1111 and the second feed end 1121.

Further, the microwave-doppler detecting module 10 also comprises a circuit board 13 and a circuit unit 14 loaded on the circuit board 13, wherein the circuit unit 14 comprises a oscillation circuit module 141 and a frequency mixing wave detection unit 142, wherein the first radiating source pole 111 and the second radiating source pole 112 are electrically coupled with different poles of the oscillation circuit module 141 respectively at the first feed end 1111 and the second feed end 1121. Specifically, the first radiating source pole 111 is feedably connected with the feeder pole of the oscillation circuit module 141 at the first feed end 1111, while the second radiating source pole 112 is electrically connected with the grounding pole of the oscillation circuit module 141 at the second feed end 1121. In which, the frequency mixing wave detection unit 142 is electrically coupled with the oscillation circuit module 141 and the antithetical dipoles 11, wherein the oscillation circuit module 141 is allowed to be powered to output a feed signal from the feeder pole thereof and to ground the grounding pole thereof. In other words, the oscillation circuit module 141 is allowed to be powered so as to be an excitation signal feed source, such that when the oscillation circuit module 141 is powered, the first radiating source pole 111 and the second radiating source pole 112 are fed by the same source of the oscillation circuit module 141 at the first feed end 1111 and the second feed end 1121 respectively, so as to emit a sounding wave beam and receive an echo of the sounding wave beam. In which, an echo signal is generated correspondingly to the receiving of the echo. The frequency mixing wave detection unit 142 outputs an intermediate-frequency signal corresponding to the frequency difference between the feed signal and the echo signal. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

It is worth mentioning that the first radiating source pole 111 and the second radiating source pole 112 respectively utilize the first feed end 1111 and the second feed end 1121 as the ends thereof so that when the first radiating source pole 111 and the second radiating source pole 112 are fed by the same source at the first feed end 1111 and the second feed end 1121 respectively, the electric potentials and the electric currents of the first radiating source pole 111 the second radiating source pole 112 are in an antithetical distribution state, which is corresponding to the antithetical coupling between the second radiating source pole 112 and the first radiating source pole 111. Namely, the coupling between the second radiating source pole 112 and the first radiating source pole 111 is simplified. Therefore, the corresponding data processing of the microwave-doppler detecting module 10 can be simplified as well, such as that the correlations between the intermediate-frequency signal output by the frequency mixing wave detection unit 142 and the corresponding object movement is increased, so as to simplify the corresponding data processing of the microwave-doppler detecting module 10. This facilitates to lower the costs of the microwave-doppler detecting module 10 and increase the stability and accuracy of the microwave-doppler detecting module 10.

In particular, according to this embodiment of the present invention, the electromagnetic reflecting surface 12 is obstructed between the circuit unit 14 and the first radiating source pole 111 and the second radiating source pole 112, so that the electromagnetic radiation produced by the coupling of the first radiating source pole 111 and the second radiating source pole 112 radiated from the first radiating source pole 111 and the second radiating source pole 112 toward the circuit unit 14 can be reflected by the electromagnetic reflecting surface 12 in order to avoid interference to the circuit unit 14, which facilitates to enhance the anti-interference ability of the microwave-doppler detecting module 10.

Specifically, according to this embodiment of the present invention, the electromagnetic reflecting surface 12 is loaded on the side of the circuit board 13 opposite to the side loading the circuit unit 14. In other words, the electromagnetic reflecting surface 12 is formed on a corresponding conductive layer (e.g. copper layer and etc.) on the side of the circuit board 13 opposite to the side loading the circuit unit 14. In which, the first radiating source pole 111 and the second radiating source pole 112 are arranged spacingly to the electromagnetic reflecting surface 12 in the space corresponding to the electromagnetic reflecting surface 12, so as to utilize the electromagnetic wave reflection characteristic of the electromagnetic reflecting surface 12 and the structural relation that the first radiating source pole 111 and the second radiating source pole 112 are arranged spacingly to the electromagnetic reflecting surface 12 in the space corresponding to the electromagnetic reflecting surface 12 to create a directional radiation characteristic of the microwave-doppler detecting module 10 from the electromagnetic reflecting surface 12 toward the directions of the first radiating source pole 111 and the second radiating source pole 112. In other words, it correspondingly creates the sensing direction of the microwave-doppler detecting module 10 from the electromagnetic reflecting surface 12 toward the directions of the first radiating source pole 111 and the second radiating source pole 112, so that the microwave-doppler detecting module 10 is adapted for detecting and sensing the object activity in the directional space corresponding to the sensing direction. Besides, it also facilitates to avoid the microwave-doppler detecting module 10 from self-activating and avoid the electromagnetic radiation produced from the coupling between the first radiating source pole 111 and the second radiating source pole 112 from interfering the circuit unit 14 loaded on the circuit board 13, so as to enhance the anti-interference ability of the microwave-doppler detecting module.

In other words, based on the antithetical coupling mode between the first radiating source pole 111 and the second radiating source pole 112, the microwave-doppler detecting module 10 has a radiation direction corresponding to the radial direction of the connection of the first feed end 1111 and the second feed end 1121, so that when the electromagnetic reflecting surface 12 is provided at the radiation direction, the radiation from the first radiating source pole 111 and the second radiating source pole 112 toward the electromagnetic reflecting surface 12 can be reflected to construct the sensing direction of the microwave-doppler detecting module 10 from the electromagnetic reflecting surface 12 toward the first radiating source pole 111 and the second radiating source pole 112 as well as to enhance the electromagnetic radiation of the sensing direction, which facilitates to enhance the directional detection range of the microwave-doppler detecting module 10.

In particular, the electromagnetic reflecting surface 12 is preferably configured to satisfy that the size thereof parallel to the direction of the connection of the first feed end 1111 and the second feed end 1121 is greater than or equal to $\lambda/4$ and the size thereof perpendicular to that direction of connection is greater than or equal to $\lambda/4$ as well, so as to enhance the reflex action of the electromagnetic reflecting surface 12 for the radiation of the direction from the first radiating source pole 111 and the second radiating source pole 112 toward the electromagnetic reflecting surface 12.

Further, the microwave-doppler detecting module 10 also comprises a first feeder wire 15 and a second feeder wire 16, wherein the first radiating source pole 111 is electrically coupled with the feeder pole of the oscillation circuit module 141 at the first feed end 1111 through the first feeder wire 15, wherein the second radiating source pole 112 is electrically connected with the grounding pole of the oscillation circuit module 141 at the second feed end 1121 through the second feeder wire 16, so as to form and create a circuit connection structure among the first radiating source pole 111 and the second radiating source pole 112 and the circuit unit 14 through the first feeder wire 15 and the second feeder wire 16 and to form and create a structural relation that utilizes the supports of the first feeder wire 15 and the second feeder wire 16 for the first radiating source pole 111 and the second radiating source pole 112 to arrange the first radiating source pole 111 and the second radiating source pole 112 spacingly to the electromagnetic reflecting surface 12 in the space corresponding to the same side of the electromagnetic reflecting surface 12.

Specifically, according to this embodiment of the present invention, the first radiating source pole 111 is integrally extended from the first feed end 1111 on the first feeder wire 15, wherein the second radiating source pole 112 is integrally extended from the second feed end 1121 on the second feeder wire 16. This simplifies the structure of the microwave-doppler detecting module 10 and facilitates to maintain the uniformity of the impedance of the microwave-doppler detecting module 10, so as to benefit the impedance matching of the microwave-doppler detecting module 10.

Further, the first feeder wire 15 and the second feeder wire 16 are parallel to each other. The distance between the first feeder wire 15 and the second feeder wire 16 corresponding to the distance between the first feed end 1111 and the second feed end 1121 satisfies to be smaller than or equal to $\lambda/32$ and, preferably, close to the range of $\lambda/128$, so that when the first radiating source pole 111 and the second radiating source pole 112 are fed through the first feeder wire 15 and the second feeder wire 16 respectively, the coupling effect between the first feeder wire 15 and the second feeder wire 16 can be reduced, so as to facilitate to reduce the depletion of the first feeder wire 15 and the second feeder wire 16. In other words, the echo depletion S11 of the first feeder wire 15 and the second feeder wire 16 is reduced, which facilitates to enhance the gain of the microwave-doppler detecting module 10.

Figure 4:
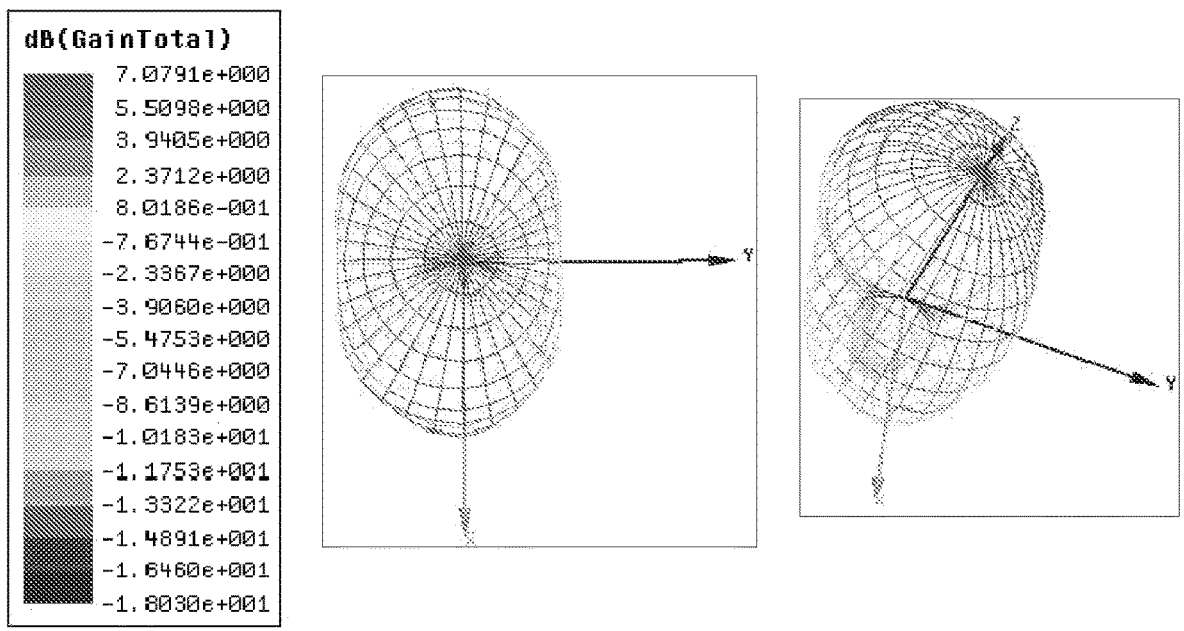
FIG. 4 is a radial direction diagram of the microwave-doppler detecting module according to the above preferred embodiment of the present invention.

Referring to FIG. 4, the radiation direction of the microwave-doppler detecting module 10 corresponding to the radiation space 100 according to the above embodiment of the present invention is illustrated. Based on the figure, the microwave-doppler detecting module 10 has a radiation gain greater than 7 dB in the directional radiation direction, which is the direction perpendicular to the plane of the X-axis and the Y-axis on the figure. Besides, the radiation space 100 protrudes from the direction. Correspondingly, the projection of the radiation space 100 presents a closely complete oval shape, which is different from microwave detection modules of conventional columnar radiation source structure which projection in the directional radiation direction thereof presents a ring shape with a detection dead zone in the middle thereof. The radiation space 100 of the microwave-doppler detecting module 10 protrudes in the directional radiation direction to avoid forming a detection dead zone.

In particular, based on the adjustment of the positional relation between the first radiating source pole 111 and the second radiating source pole 112, the radiation space 100 may be adjusted to correspondingly change the angle and direction of the detection of the microwave-doppler detecting module 10 from the electromagnetic reflecting surface 12 toward the direction of the first radiating source pole 111 and the second radiating source pole 112, so as to enhance the applicability of the microwave-doppler detecting module 10.

According to one embodiment, the positional relation between the first radiating source pole 111 and the second radiating source pole 112 is capable of being adjusted through adjusting the first radiating source pole 111 and the second radiating source pole 112 to turn around the first feed end 1111 and the second feed end 1121 respectively. According to one embodiment of the present invention, the first radiating source pole 111 and the second radiating source pole 112 are respectively turned around the first feed end 1111 and the second feed end 1121 in the direction close to the electromagnetic reflecting surface 12 for adjustment. That is the first radiating source pole 111 is configured to be a columnar conductive wire extended from the first feed end 1111 as an end toward the connection direction of the second feed end 1121 to the first feed end 1111 and toward the direction of the electromagnetic reflecting surface 12 at the same time, wherein the second radiating source pole 112 is configured to be a columnar conductive wire extended from the second feed end 1121 as an end toward the connection direction of the first feed end 1111 to the second feed end 1121 and toward the direction of the electromagnetic reflecting surface 12.

It is worth mentioning that by adjusting the shape of the second radiating source pole 112 and the first radiating source pole 111, such as through bending the second radiating source 112 and the first radiating source pole 111 to adjust their shapes, the size of the microwave-doppler detecting module 10 can be further reduced while the wire length parameter L2 of the second radiating source pole 112 satisfies that $\lambda/16 \leq L2 \leq \lambda$ and the wire length parameter L1 of the first radiating source pole 111 satisfies that $\lambda/16 \leq L1 \leq \lambda$. In other words, while the antithetical coupling between the second radiating source pole 112 and the first radiating source pole 111 is ensured, it facilitates to reduce the size of the microwave-doppler detecting module 10. In particular, based on the adjustment of the shape of the first radiating source pole 111 and the second radiating source pole 112 or the adjustment of the positional relation between the first radiating source pole 111 and the second radiating source pole 112, the radiation space 100 can be adjusted to correspondingly change the coverage area of the electromagnetic wave radiated by the microwave-doppler detecting module 10, so as to enhance the applicability of the microwave-doppler detecting module 10.

Figure 5:
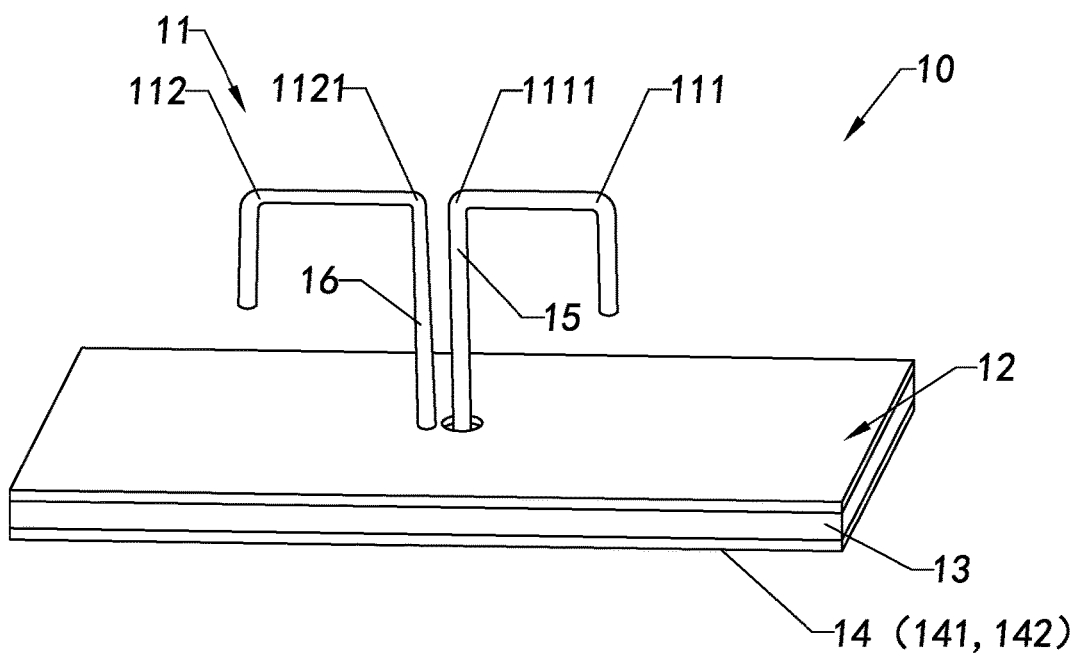
FIG. 5 is a perspective view of the microwave-doppler detecting module according to an alternative mode of the above preferred embodiment of the present invention.

For example, referring to FIG. 5 of the drawings, the adjustment of the shapes of the first radiating source pole 111 and the second radiating source pole 112 for the microwave-doppler detecting module 10 according to an alternative mode of the above preferred embodiment of the present invention is illustrated. According to this alternative mode of the present invention, the first radiating source pole 111 is extended from the first feed end 1111 to the direction of the second feed end 1121 to the first feed end 1111 and the direction close to the electromagnetic reflecting surface 12, while the second radiating source pole 112 is extended from the second feed end 1121 to the direction of the first feed end 1111 to the second feed end 1121 and the direction close to the electromagnetic reflecting surface 12. In other words, the adjustment of the shapes of the first radiating source pole 111 and the second radiating source pole 112 forms the conditions that the end of the first radiating source pole 111 opposite to the first feed end 1111 is, comparing to the first feed end 1111, closer to the electromagnetic reflecting surface 12 and that the end of the second radiating source pole 112 opposite to the second feed end 1121 is, comparing to the second feed end 1121, closer to the electromagnetic reflecting surface 12.

Especially, the first radiating source pole 111 is extended from the first feed end 1111 to the direction of the second feed end 1121 to the first feed end 1111 and the direction approaching the electromagnetic reflecting surface 12. The second radiating source pole 112 is extended from the second feed end 1121 to the direction of the first feed end 1111 to the second feed end 1121 and the direction approaching the electromagnetic reflecting surface 12. The sizes corresponding to the first radiating source pole 111 and the second radiating source pole 112 in a direction perpendicular to the electromagnetic reflecting surface 12 are both within the range of being greater than or equal to $\lambda/32$ and smaller than or equal to $\lambda/4$, so as to ensure the antithetical coupling of the first radiating source pole 111 and the second radiating source pole 112 and to reduce the size of the microwave-doppler detecting module 10 based on the size arrangement corresponding to the first radiating source pole 111 and the second radiating source pole 112 in the direction perpendicular to the electromagnetic reflecting surface 12 as well as to allow the radiation space 100 of the microwave-doppler detecting module 10 to be adjusted.

Specifically, according to this alternative mode of the present invention, the first radiating source pole 111 and the second radiating source pole 112 are each bent for once. Corresponding to the bent first radiating source pole 111 is extended from the first feed end 1111 along a direction from the second feed end 1121 toward the first feed end 1111 and then extended in another direction towards the electromagnetic reflecting surface 12, the bent second radiating source pole is extended from the second feed end 1121 along a direction from the first feed end 1111 towards the second feed end 1121 and then extended in another direction towards the electromagnetic reflecting surface 12. Accordingly, the first and second radiating source poles 111, 112 are correspondingly formed in such a manner that one end of the first radiating source pole 111, opposite to the first feed end 1111, is closer to the electromagnetic reflecting surface 12 with respect to the first feed end 1111, and that one end of the second radiating source pole 112, opposite to the second feed end 1121, is closer to the electromagnetic reflecting surface 12 with respect to the second feed end 1121.

Hence, according to this alternative mode of the preferred embodiment of the present invention, the size of the portion of the first radiating source pole 111 along a direction perpendicular to the electromagnetic reflecting surface 12 is arranged with respect to the distance L11 from the end of the first radiating source pole 111 relative to the first feed end 1111 and the bent position of the first radiating source pole 111, where the L11 satisfies that $\lambda/32 \leq L11 \leq \lambda/4$. The size of the portion of the second radiating source pole 112 along a direction perpendicular to the electromagnetic reflecting surface 12 is arranged with respect to the distance L21 from the end of the second radiating source pole 112 relative to the second feed end 1121 and the bent position of the second radiating source pole 112, where the L21 satisfies that $\lambda/32 \leq L21 \leq \lambda/4$. Based on the size arrangements corresponding to the L11 and the L21, the radiation space 100 of the microwave-doppler detecting module 10 can be adjusted and the gain of the corresponding microwave-doppler detecting module 10 can be adjusted as well.

Figure 6:
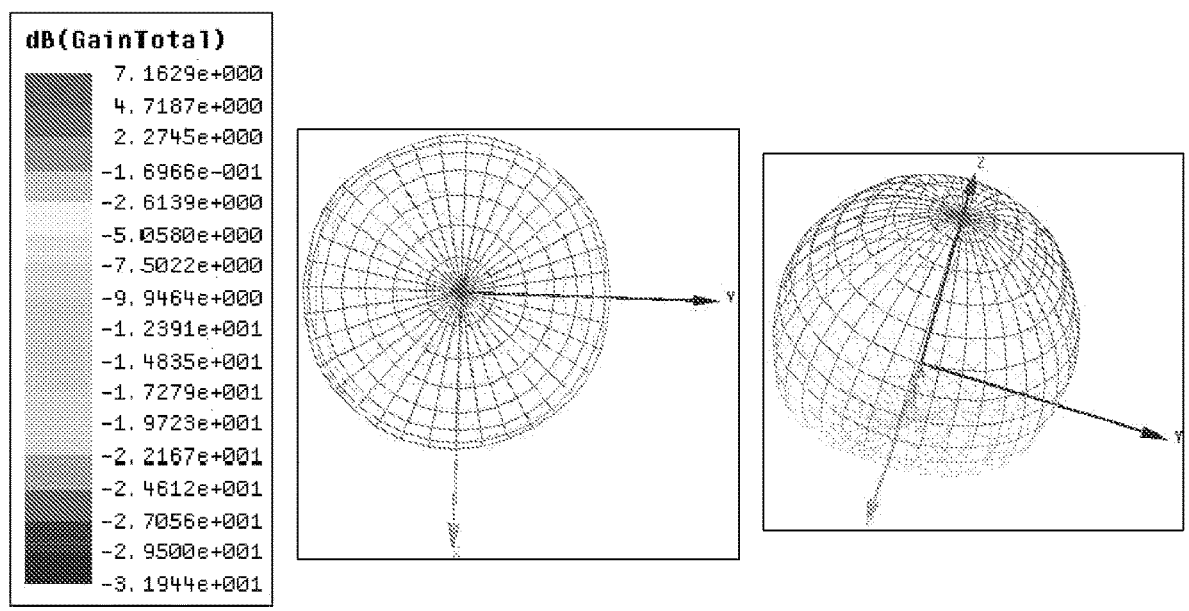
FIG. 6 is a radial direction diagram of the microwave-doppler detecting module according to the above alternative mode of the above preferred embodiment of the present invention.

Referring to FIG. 6 of the drawings of the present invention, the radiation direction of the microwave-doppler detecting module 10 corresponding to the radiation space 100 according to the above alternative mode of the preferred embodiment of the present invention is illustrated. According to the figure, the microwave-doppler detecting module 10 also has a radiation gain greater than 7 dB in the directional radiation direction, which is the direction perpendicular to the plane of the X-axis and the Y-axis in the figure. Especially, a difference from the radiation space 100 of the microwave-doppler detecting module of the above preferred embodiment is that, according to this alternative mode of the present invention, based on the adjustment of the shapes of the first radiating source pole 111 and the second radiating source pole 112, under the conditions that the end of the first radiating source pole 111 opposite to the first feed end 1111 is, with respect to the first feed end 1111, closer to the electromagnetic reflecting surface 12 and that the end of the second radiating source pole 112 opposite to the second feed end 1121 is, with respect to the second feed end 1121, closer to the electromagnetic reflecting surface 12, the radiation space 100 is adjusted into a condition that a cross section thereof perpendicular to the directional radiation direction is close to a full and complete circle, so as to facilitates to enhance the applicability of the detection of the microwave-doppler detecting module 10 for the object activities in the directional space in various application sites. In addition, another difference from the conventional microwave detection module of columnar radiation source structure and microwave detection module of flat radiation source structure which cross section perpendicular to the directional radiation direction thereof is in a ring-shape that has a detection dead zone in the middle thereof is that the radiation space 100 of the microwave-doppler detecting module 10 protrudes at the directional radiation direction, which avoids detection dead zone.

It is worth mentioning that, according to the above alternative mode, there are structural relations that the first radiating source pole 111 is extended from the first feed end 1111 toward the direction of the second feed end 1121 to the first feed end 1111 and toward the direction of the electromagnetic reflecting surface 12, and that the second radiating source pole 112 is extended from the second feed end 1121 toward the direction of the first feed end 1111 to the second feed end 1121 and toward the direction of the electromagnetic reflecting surface 12. In one alternative mode of the preferred embodiment of the present invention, the first radiating source pole 111 is extended from the first feed end 1111 as an end towards the direction of the second feed end 1121 to the first feed end 1111 and the direction close to the electromagnetic reflecting surface 12 at the same time, and that the second radiating source pole 112 is extended from the second feed end 1121 as an end toward the direction of the first feed end 1111 to the second feed end 1121 and the direction close to the electromagnetic reflecting surface 12 at the same time, so as to form and create a condition that the end of the second radiating source pole 112 opposite to the second feed end 1121, with respect to the second feed end 1121, is closer to the electromagnetic reflecting surface 12, which facilitates to adjust the radiation space 100 into a condition that the cross section thereof perpendicular to the directional radiation direction is close to a full and complete circle, so as to enhance the applicability of the detection of the microwave-doppler detecting module 10 for the object activities in the directional space in various application sites.

For example, according to some embodiments of the present invention, the first radiating source pole 111 and the second radiating source pole 112 are arranged in a bending manner. Specifically, the first radiating source pole 111 is a columnar curvy conductive wire formed through extending from the first feed end 1111 as an end along a connection direction from the second feed end 1121 towards the first feed end 1111 and a direction towards the electromagnetic reflecting surface 12 at the same time, wherein the second radiating source pole 112 is a columnar curvy conductive wire formed through extending from the second feed end 1121 as an end along a connection direction from first feed end 1111 towards the second feed end 1121 and a direction towards the electromagnetic reflecting surface 12 at the same time.

In other words, the curvy shape of the first radiating source pole 111 is a result that the second feed end 1121 extends toward the connection direction of the first feed end 1111 and the direction towards the electromagnetic reflecting surface 12 in a nonlinear manner. Similarly, the curvy shape of the second radiating source pole 112 is a result that the first feed end 1111 extends toward the connection direction of the second feed end 1121 and the direction towards the electromagnetic reflecting surface 12 in a nonlinear manner. For an example, each of the first radiating source pole 111 and the second radiating source pole 112 is bent towards the direction closer to the electromagnetic reflecting surface 12 to form the columnar curvy conductive wire. For another example, each of the first radiating source pole 111 and the second radiating source pole 112 is bent in the direction deviating from the electromagnetic reflecting surface 12 to form columnar curvy conductive wires.

Figure 7:
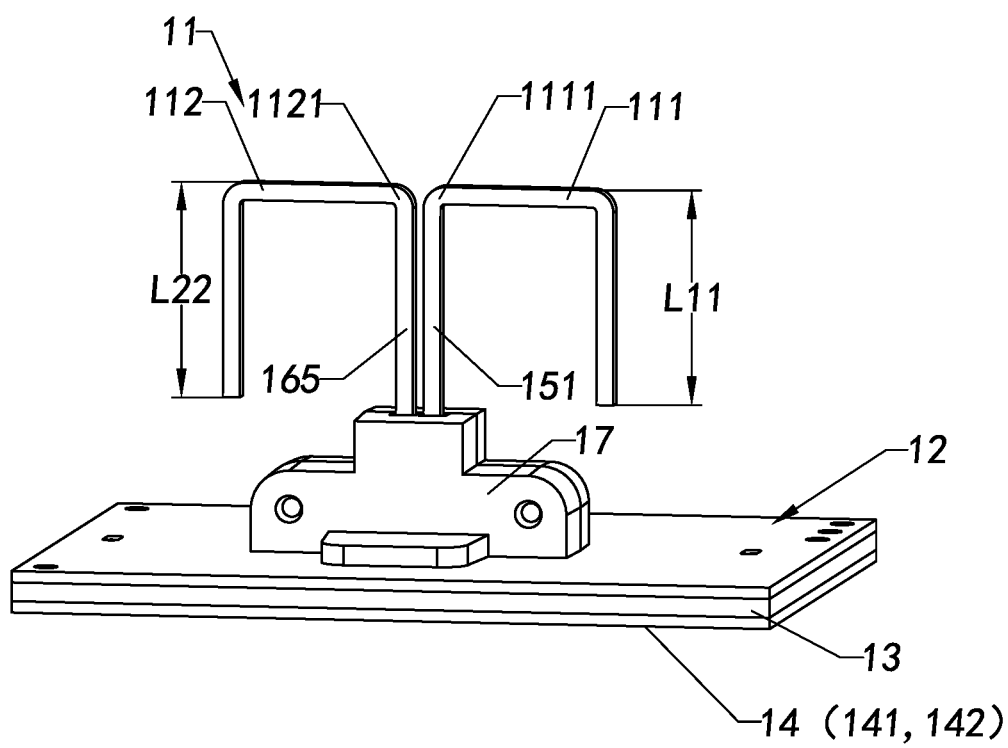
FIG. 7 is a perspective view of the microwave-doppler detecting module according to another alternative mode of the above preferred embodiment of the present invention.
Figure 8:
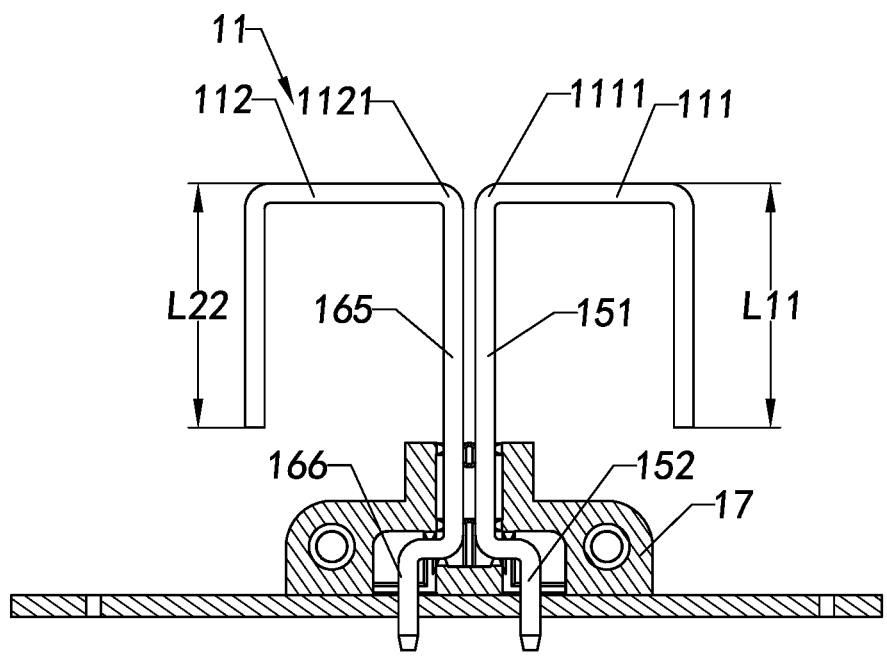
FIG. 8 is a side sectional view of the microwave-doppler detecting module according to the above another alternative mode of the above preferred embodiment of the present invention.

Further, referring to FIGS. 7 and 8 of the drawings of the present invention, the microwave-doppler detecting module 10 according to another alternative mode of the above preferred embodiment of the present invention is illustrated. Particularly, according to this another alternative mode of the preferred embodiment of the present invention, the first feeder wire 15 has a first feeder section 151 and the second feeder wire 16 has a second feeder section 165. The first feeder section 151 and the second feeder section 165 are parallel columnar straight conductive wires extended from the first feed end 1111 and the second feed end 1121 respectively, so that a distance between the first feeder section 151 and the second feeder section 165 and a corresponding distance between the first feed end 1111 and the second feed end 1121 satisfies to be smaller than or equal to $\lambda/32$ and a range preferably close to $\lambda/128$, so that coupling function between the first feeder section 151 and the second feeder section 165 can be reduced, which facilitates to reduce the depletion of the first feeder wire 15 and the second feeder wire 16. In other words, the echo depletion S11 of the first feeder wire and the second feeder wire is reduced, which facilitates to further enhance the gain of the microwave-doppler detecting module 10.

In particular, according to this another alternative mode of the preferred embodiment of the present invention, the first feeder wire 15 further has a first coupling section 152 integrally extended from the first feeder section 151, and the second feeder wire 16 further has a second coupling section 166 integrally extended from the second feeder section 165. In other words, the first feeder section 151 is electrically coupled with the oscillation circuit module 141 and affixedly coupled with the circuit board 13 through the first coupling section 152, and that the second feeder section 165 is electrically coupled with the earth potential of the oscillation circuit module 141 and affixedly coupled with the circuit board 13 through the second coupling section 166. The first coupling section 152 is integrally extended from the first feeder section 151 in a direction deviating from the first feeder section 151. The second coupling section 166 is integrally extended from the second feeder section 165 in a direction deviating from the second feeder section 165. Therefore, the lengths of the first feeder wire 15 and the second feeder wire 16 can be configured through the designs of the lengths and shapes of the first coupling section 152 and the second coupling section 166 respectively, so as to facilitate to not only satisfy the impedance matching and corresponding resonance frequency design of the microwave-doppler detecting module 10 based on the arrangement of the corresponding lengths of the first feeder wire 15 and the second feeder wire 16, but also maintain the distance between the electromagnetic reflecting surface 12 and a midpoint of the connection of the first feed end 1111 and the second feed end 1121 in a proper range, such as being greater than or equal to $\lambda/32$ and smaller than or equal to $\lambda/2$ or close to the preferable range of $\lambda/4$, based on the shape design of the first coupling section 152 and the second coupling section 166. That is, based on the design of the lengths and shapes of the first coupling section 152 and the second coupling section 166, the microwave-doppler detecting module 10 is able to not only satisfy the corresponding impedance matching and resonance frequency design, but also enhance the reflex action of the electromagnetic reflecting surface 12 for the radiation in the direction from the first radiating source pole 111 and the second radiating source pole 112 to the electromagnetic reflecting surface 12, so as to facilitate to extent the detecting distance of the microwave-doppler detecting module 10.

In other words, based on the designs of the shapes and the lengths of the first coupling section 152 and the second coupling section 166, the distance between the electromagnetic reflecting surface 12 and the midpoint of the connection of the first feed end 1111 and the second feed end 1121 can be maintained or shortened within the range greater than or equal to $\lambda/32$ and smaller than or equal to $\lambda/2$. Besides, the microwave-doppler detecting module 10 can satisfy the corresponding impedance matching and the resonance frequency design. Hence, the microwave-doppler detecting module 10 is able to not only satisfy the corresponding impedance matching and the resonance frequency design, but also have higher gain.

Further, according to this another alternative mode of the preferred embodiment of the present invention, the first coupling section 152 and the second coupling section 166 integrally extended away from the first feeder section 151 and the second feeder section 165 respectively, so that the distance between the first coupling section 152 and the second coupling section 166 in the directions perpendicular to the first feeder section 151 and the second feeder section 165 is larger than the distance between the first feeder section 151 and the second feeder section 165, so that the first feeder section 151 and the second feeder section 165 which are parallel to each other are in a condition of closing to each other within a distance smaller than or equal to $\lambda/32$, which facilitates to electrically couple the first feeder wire 15 with oscillation circuit module 141 at the first coupling section 152 through welding and soldering and to affixedly couple the first feeder wire 15 with the circuit board 13 as well as to electrically couple the second feeder wire 16 with the earth potential of the oscillation circuit module 141 at the second coupling section 166 through welding and soldering and affixedly couple the second feeder wire 16 with the circuit board 13.

Specifically, according to this another alternative mode of the preferred embodiment of the present invention, the distance of the first coupling section 152 and the second coupling section 166 in the direction perpendicular to the first feeder section 151 and the second feeder section 165 is smaller than or equal to $\lambda/8$. The distance of the first coupling section 152 and the second coupling section 166 in the direction parallel to the first feeder section 151 and the second feeder section 165 is also smaller than or equal to $\lambda/8$. Therefore, it not only ensures the low loss characteristic between the first feeder section 151 and the second feeder section 165 so as to be capable of satisfying the corresponding impedance matching and resonance frequency design based on the design of the lengths and shapes of the first coupling section 152 and the second coupling section 166, but also reinforces the reflex action of the electromagnetic reflecting surface 12 for the radiations of the directions from the first radiating source pole 111 and the second radiating source pole 112 toward the electromagnetic reflecting surface 12.

It is worth mentioning that, according to this another alternative mode of the preferred embodiment of the present invention, the first coupling section 152 is extended from the end of the first feeder section 151 that is opposite to the first feed end 1111 toward a direction perpendicular to the first feeder section 151 and then toward another direction parallel to the first feeder section 151, while the second coupling section 166 is extended from the end of the second feeder section 165 that is opposite to the second feed end 1121 toward a direction perpendicular to the second feeder section 165 and then toward another direction parallel to the second feeder section 165. In some embodiments of the present invention, the first coupling section 152 may be configured to be extended from the end of the first feeder section 151 that is opposite to the first feed end 1111 toward a direction perpendicular to the first feeder section 151 and a direction parallel to the first feeder section 151 at the same time. For example, the first coupling section 152 can be a columnar curvy conductive wire extended from the end of the first feeder section 151 that is opposite to the first feed end 1111 to the direction perpendicular to the first feeder section 151 and the direction parallel to the first feeder section 151 at the same time. Similarly, the second coupling section 166 may be configured to be extended from the end of the second feeder section 165 that is opposite to the second feed end 1121 to the direction perpendicular to the second feeder section 165 and the direction parallel to the second feeder section 165 at the same time. For example, the second coupling section 166 can be a columnar curvy conductive wire extended from the end of the second feeder section 165 that is opposite to the second feed end 1121 to the direction perpendicular to the second feeder section 165 and the direction parallel to the second feeder section 165 at the same time. The present invention shall not be limited here.

Further, according to this another alternative mode of the preferred embodiment of the present invention, the high gain microwave-doppler detecting module 10 further comprises a fixing base 17. The fixing base 17 is attached on a side of the circuit board 13 having the electromagnetic reflecting surface 12 provided thereon. The first feeder wire 15 and the second feeder wire 16 are partially clamped and affixed to the fixing base 17, so as to facilitates to maintain the first feeder section 151 and the second feeder section 165 in a parallel manner and a condition close to each other within a distance smaller than or equal to $\lambda/32$, that facilitates to maintain the uniformity in producing and the stability in utilizing of the high gain microwave-doppler detecting module 10.

Figure 9:
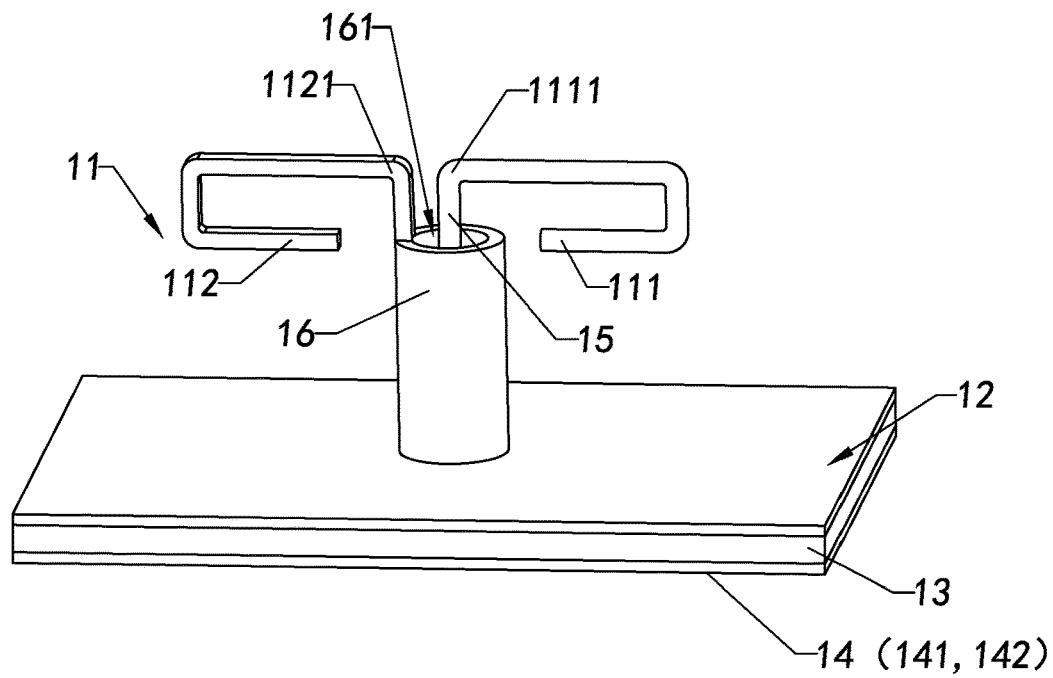
FIG. 9 is a perspective view of the microwave-doppler detecting module according to another alternative mode of the above preferred embodiment of the present invention.

Further, referring to FIG. 9 of the drawings of the present invention, the microwave-doppler detecting module 10 according to another alternative mode of the above preferred embodiment of the present invention. In particular, according to this alternative mode of the preferred embodiment of the present invention, the second feeder wire 16 encircles and surrounds the first feeder wire 15 so as to form and create an electromagnetic shielding cavity 161, such that when the second feeder wire 16 is grounded, the influence of the coupling between the second feeder wire 16 and the first feeder wire 15 to the coupling between the first radiating source pole 111 and the second radiating source pole 112 can be reduced and the interference of external electromagnetic radiation to the first feeder wire 15 can be shielded, that thereby facilitates to enhance the anti-interference ability of the microwave-doppler detecting module 10.

Preferably, the second feeder wire 16 is arranged being surrounded and encircled by the first feeder wire 15 coaxially, so that when the first radiating source pole 111 is fed at the first feed end 1111 through the first feeder wire 15 and the second radiating source pole 112 is fed at the second feed end 1121 through the second feeder wire 16, the coupling between the first radiating source pole 111 and the second radiating source pole 112 in an antithetical manner is facilitated.

Especially, on the basis of the condition that the second radiating source pole 112 is grounded according to the above embodiment, according to some embodiments, the first radiating source pole 111 is further grounded, so as to reduce the impedance of the microwave-doppler detecting module, so that the quality factor (Q value) of the microwave-doppler detecting module can be increased, which facilitates the anti-interference ability of the microwave-doppler detecting module.

Figure 10:
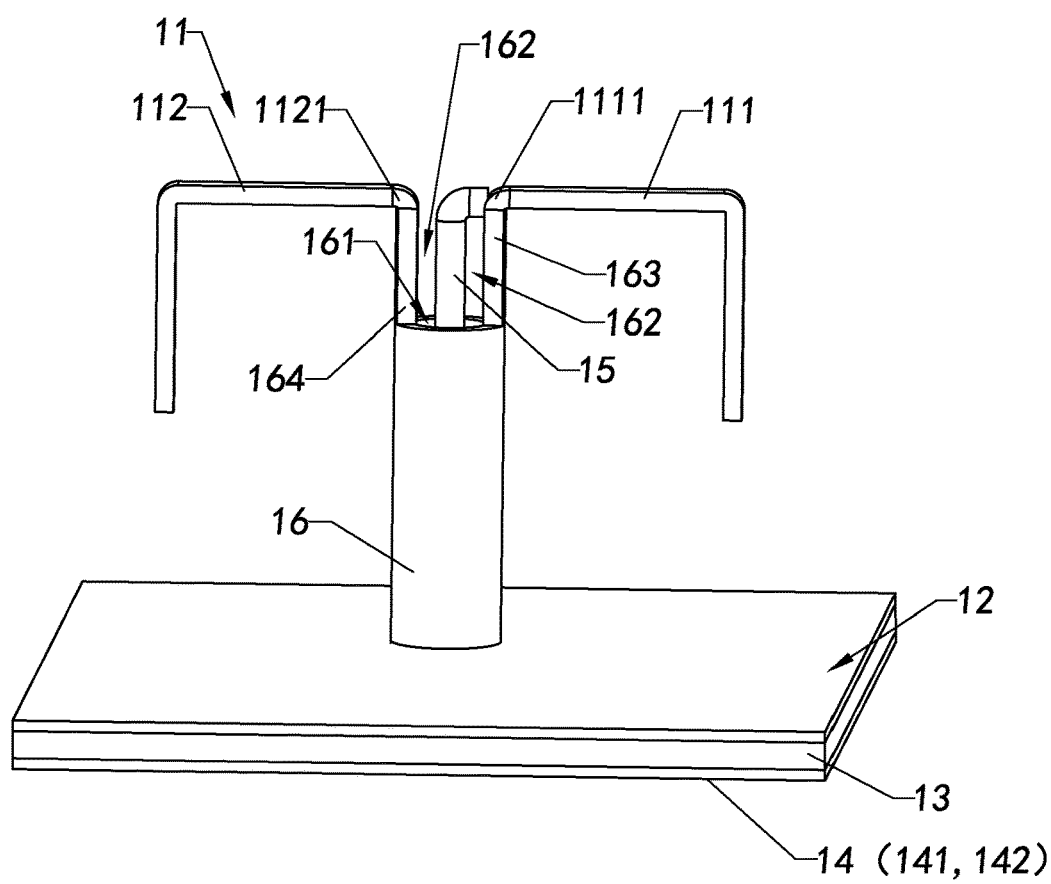
FIG. 10 is a perspective view of the microwave-doppler detecting module according to another alternative mode of the above preferred embodiment of the present invention.

Referring to FIG. 10, the 3D structure of the microwave-doppler detecting module 10 according to another alternative mode of the above embodiment of the present invention is illustrated. Particularly, comparing to the above preferred embodiment and its alterative modes, according to this alternative mode of the present invention, the first radiating source pole 111 is further electrically connected with the second feeder wire 16 so as to be grounded.

Specifically, according to this alternative mode of the present invention, the second feeder wire 16 is arranged to surround around the first feeder wire 15 coaxially and further has a pair of notch positions 162. The second feeder wire 16 has a pair of notches formed at the notch positions 162 and extended from the end connected with the second radiating source pole 112 along a direction of the first feeder wire 15. The pair of the notch positions 162 defines a first arm 163 and a second arm 164 of the second feeder wire 16. That is, the first arm 163 and the second arm 164 are two portions of the second feeder wire 16 wherein the pair of the notch positions 162 is defined therebetween. The second radiating source pole 112 is conductively extended from the second feed end 1121 to the second arm 164 of the second feeder wire 16. The first radiating source pole 111 is conductively extended from the first feed end 1111 to the first arm 163 of the second feeder wire 16 and is conductively connected with the first feeder wire 15 at the first feed end 1111, so as to create a condition that the first radiating source pole 111 is grounded.

It is worth mentioning that, a notch depth of each of the notches of the second feeder wire 16 from the end of the second feeder wire 16 connected with the second radiating source pole 112 along the direction of the first feeder wire 111 is greater than or equal to $\lambda/128$, so that when the first radiating source pole 111 is grounded through the first arm 163 of the second feeder wire 16, the first radiating source pole 111 can be fed and excited at the first feed end 1111 through the first feeder wire 15, and the second radiating source pole 112 can be fed at the second feed end 1121 through the second feeder wire 16 at the same time, so as to facilitate coupling between the first radiating source pole 111 and the second radiating source pole 112 in an antithetical manner.

It is understandable that, based on the arrangement of the depth of the notches 162, corresponding impedance can be created, so as to facilitate the impedance matching between the antithetical dipoles 11 and the first feeder wire 15 and the second feeder wire 16 and the oscillation circuit module 141.

Especially, according to this alternative mode of the present invention, the first radiating source pole 111 and the second radiating source pole 112 are bent for once, so as to maintain that the wire length parameter L2 of the second radiating source pole 112 satisfies $\lambda/16 \leq L2 \leq \lambda$ and that the wire length parameter L1 of the first radiating source pole 111 satisfies $\lambda/16 \leq L1 \leq \lambda$ at the same time, so that the sizes of the second radiating source pole 112 and the first radiating source pole 111 parallel to the direction of the connection of the first feed end 1111 and the second feed end 1121 can be reduced.

Figure 11:
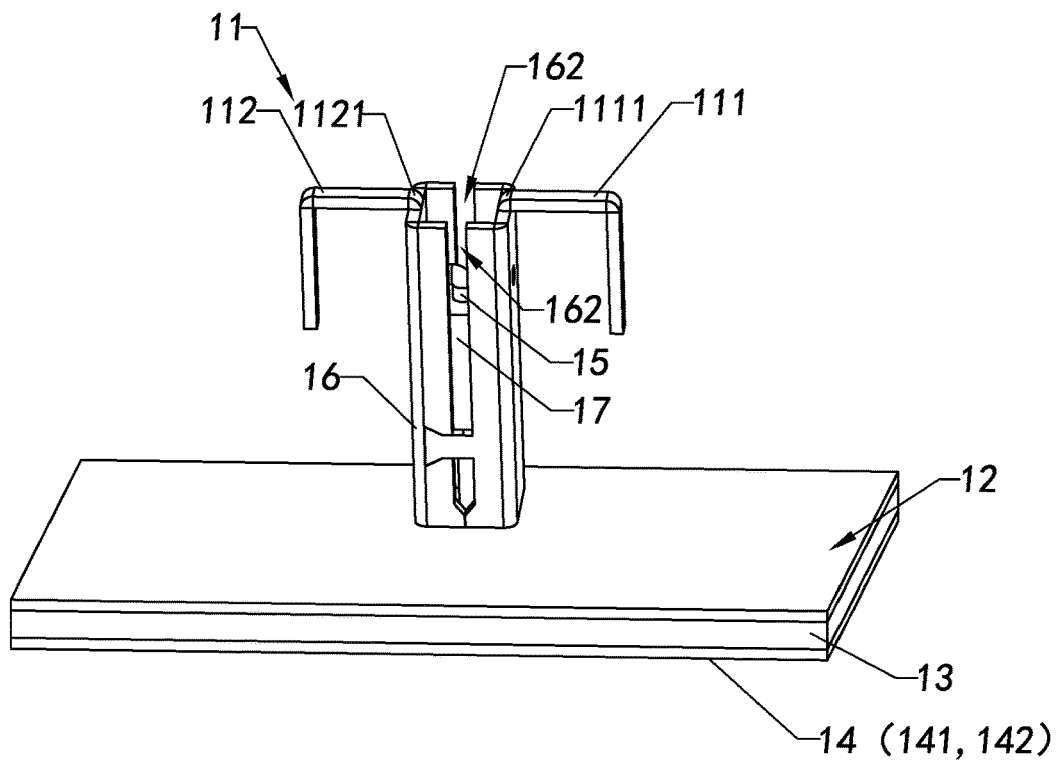
FIG. 11 is a perspective view of the microwave-doppler detecting module according to a substitutional structure of the above one more alternative mode of the above preferred embodiment of the present invention.

Further, referring to FIG. 11 of the drawings of the present invention, based on the concept that the second feeder wire 16 is configured as a dismountable tubular structure, an alternative structure for the microwave-doppler detecting module corresponding to that as illustrated in the FIG. 10 is illustrated. A difference to the microwave-doppler detecting module 10 as illustrated in FIG. 10 is that, according to this alternative structure of the present invention, the second feeder wire 16 is configured as a dismountable square tubular structure, which means that the second feeder wire 16 is a square tubular structure that can be assembled in a buckling manner or other dismountable manner.

Figure 12:
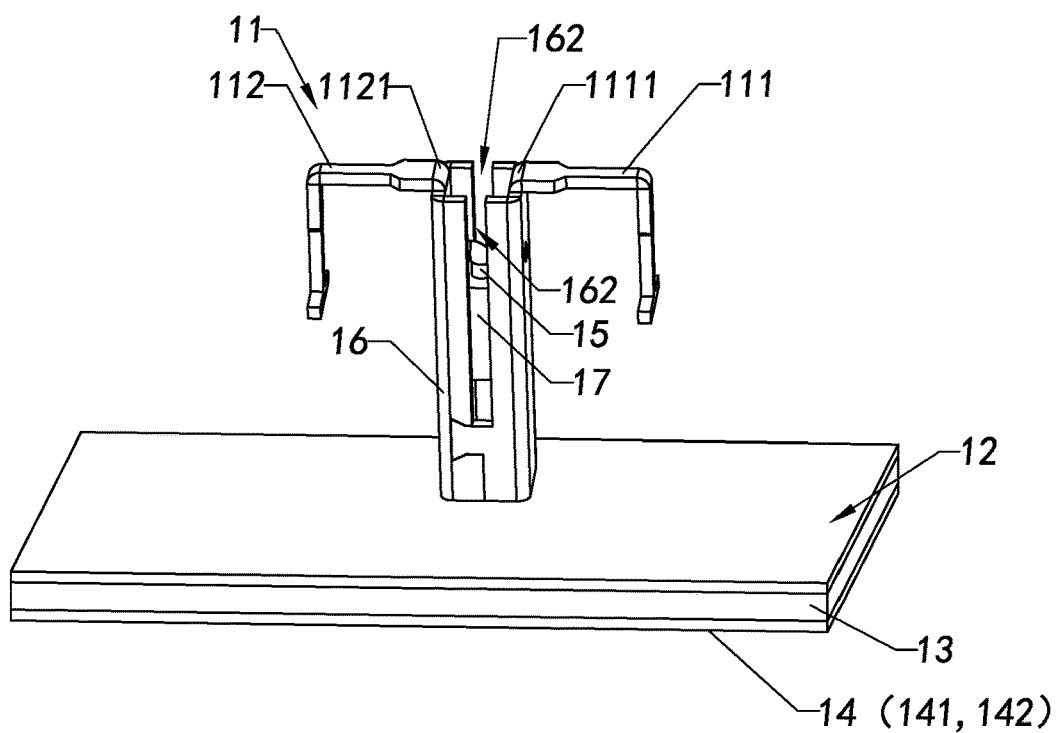
FIG. 12 is a perspective view of the microwave-doppler detecting module according to a modification of the above substitutional structure of the above alternative modes of the above preferred embodiment of the present invention.

Further referring to FIG. 12 of the drawings of the present invention, based on the concept that the second feeder wire 16 is configured as a dismountable tubular structure, FIG. 12 illustrates another alternative structure for the microwave-doppler detecting module corresponding to that in the FIG. 11. According to this alternative structure, the end of the first radiating source pole 111 that is opposite to the first feed end 1111 is further extended toward two opposite directions perpendicular to the connection of the first feed end 1111 and the second feed end 1121, and that the end of the second radiating source pole 112 that is opposite to the second feed end 1121 is further extended toward the two opposite directions perpendicular to the connection of the first feed end 1111 and the second feed end 1121, so as to suppress the energy accumulation at the end of the first radiating source pole 111 opposite to the first feed end 1111 and to suppress the energy accumulation at the end of the second radiating source pole 112 opposite to the second feed end 1121 when the first radiating source pole 111 and the second radiating source pole 112 are antithetically coupled, so as to facilitate to maintain the stability of the microwave-doppler detecting module 10.

Figure 13:
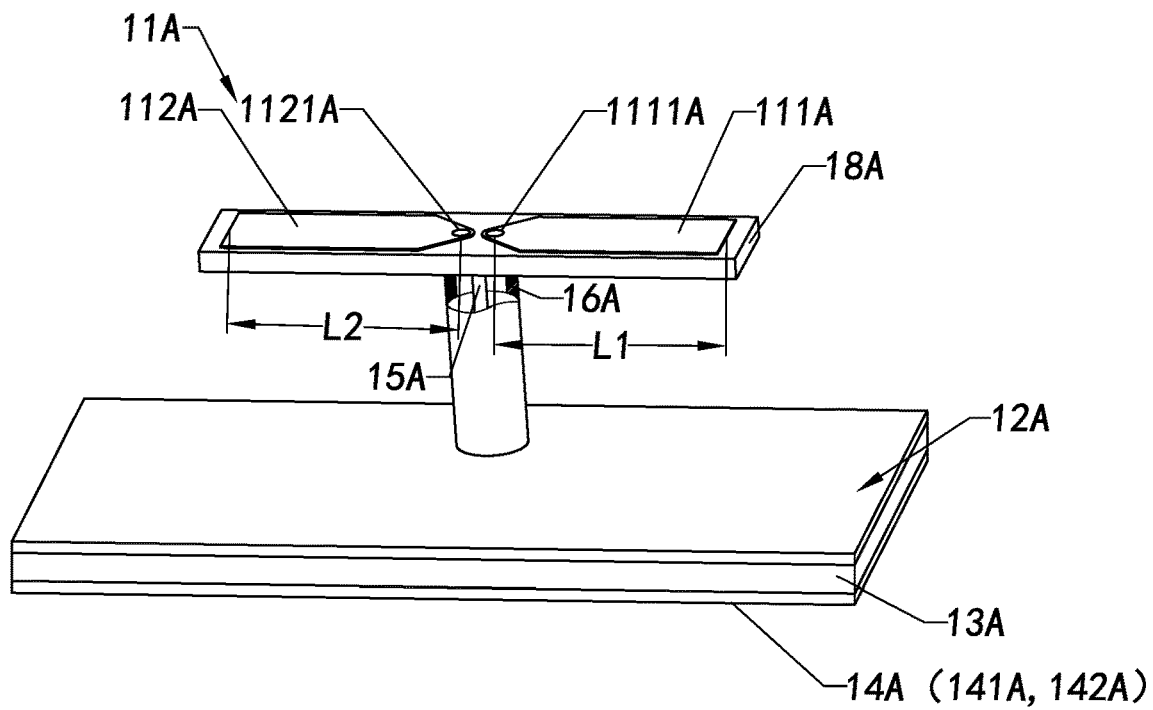
FIG. 13 is a perspective view of a microwave-doppler detecting module according to an alternative preferred embodiment of the present invention.

In order to further disclose the present invention, referring to FIG. 13 of the drawings of the present invention, the 3D structure of another microwave-doppler detecting module 10A according to another preferred embodiment of the present invention is illustrated. Similarly, the microwave-doppler detecting module 10A comprises a second radiating source pole 112A and a first radiating source pole 111A, wherein the second radiating source pole 112A has a second feed end 1121A, while the first radiating source pole 111A has a first feed end 1111A, wherein the second feed end 1121A and the first feed end 1111A are close to each other within a distance of λ/4, wherein the second radiating source pole 112A is extended from the second feed end 1121A as one end, wherein the first radiating source pole 111A is extended from the first feed end 1111A as one end, wherein the first radiating source pole 111A is configured to be adapted for being fed at the first feed end 1111A, wherein the second radiating source pole is configured to be adapted for being fed at the second feed end 1121A, so that when the first radiating source pole 111A is fed at the first feed end 1111A and the second radiating source pole 112A is fed by the same source at the second feed end 1121A, the first radiating source pole 111A from the first feed end 1111A along the first radiating source pole 111A is correspondingly coupled to the corresponding positions of the second radiating source pole 112A from the second feed end 1121A along the second radiating source pole 112A, so as to form the antithetical coupling arrangement between the first radiating source pole 111A and the second radiating source pole 112A.

A difference from the above preferred embodiment is that, according to this another preferred embodiment of the present invention, the microwave-doppler detecting module 10A further comprises a medium substrate 18A, wherein the first radiating source pole 111A and the second radiating source pole 112A is provided on the same side of the medium substrate 18A in a form of microstrip line, so that the shapes and sizes of the first radiating source pole 111A and the second radiating source pole 112A can correspondingly be implemented easily based on the technology of microstrip line.

The microwave-doppler detecting module 10A also comprises a circuit board 13A and a circuit unit 14A provided on the circuit board 13A, wherein the circuit unit 14A comprises an oscillation circuit module 141A and a frequency mixing wave detection unit 142A, wherein the first radiating source pole 111A and the second radiating source pole 112A are electrically coupled with different poles of the oscillation circuit module 141A respectively at the first feed end 1111A and the second feed end 1121A. Specifically, the first radiating source pole 111A is feedably connected with the feeder pole of the oscillation circuit module 141A at the first feed end 1111A, while the second radiating source pole 112A is electrically connected with the grounding pole of the oscillation circuit module 141A at the second feed end 1121A. In which, the frequency mixing wave detection unit 142A is electrically coupled with the oscillation circuit module 141A and the antithetical dipoles 11A, wherein the oscillation circuit module 141A is allowed to be powered to output a feed signal from the feeder pole thereof and to ground the grounding pole thereof. In other words, the oscillation circuit module 141A is allowed to be powered so as to be an excitation signal feed source, such that when the oscillation circuit module 141A is powered, the first radiating source pole 111A and the second radiating source pole 112A are fed by the same source of the oscillation circuit module 141A at the first feed end 1111A and the second feed end 1121A respectively, so as to emit a sounding wave beam and receive an echo of the sounding wave beam. In which, an echo signal is generated correspondingly to the receiving of the echo. The frequency mixing wave detection unit 142A outputs an intermediate-frequency signal corresponding to the frequency difference between the feed signal and the echo signal. Then, based on the Doppler Effect, the intermediate-frequency signal is corresponding to the movement of the object reflecting the sounding wave beam and producing the echo correspondingly. Hence, the microwave-doppler detecting module is suitable for sensing and detecting object movement.

Further, the first radiating source pole 111A and the second radiating source pole 112A are disposed symmetrically to a midpoint of the connection of the first feed end 1111A and the second feed end 1121A. That is the first radiating source pole 111A and the second radiating source pole 112A have the same shape and size and the positional relation between the first radiating source pole 111A and the second radiating source pole 112A satisfies that the first radiating source pole 111A is able to surround around the midpoint of the connection of the first feed end 1111A and the second feed end 1121A to turn 180 degrees for at least one direction and to be overlapped with the position of the second radiating source pole 112A. This facilitates to ensure the coupling between the second radiating source pole 112A and the first radiating source pole 111A in an antithetical manner.

Specifically, according to this another preferred embodiment of the present invention, the medium substrate 18A is disposed spacingly to the circuit board 13A in a manner of being parallel to the circuit board 13A.

Specifically, the microwave-doppler detecting module 10A also comprises a first feeder wire 15A and a second feeder wire 16A, wherein the first radiating source pole 111A is electrically coupled with the feeder pole of the oscillation circuit module 141A at the first feed end 1111A through the first feeder wire 15A, wherein the second radiating source pole 112A is electrically connected with the earth potential of the oscillation circuit module 141A at the second feed end 1121A through the second feeder wire 16A, so as to form and create a circuit connection structure among the first radiating source pole 111A and the second radiating source pole 112A and the circuit unit 14A and to form and create a structural relation that utilizes the supports of the first feeder wire and the second feeder wire 16A for the medium substrate 18A with the first radiating source pole 111A and the second radiating source pole 112A provided thereon to form and create a structural relation that the medium substrate 18A is disposed spacingly to the circuit board 13A.

Especially, according to this another preferred embodiment of the present invention, the second feeder wire 16A and the first feeder wire 15A are embodied as that the second feeder wire 16A is a shielding wire surrounding and encircling the first feeder wire 15A, wherein the shielding wire is insertably arranged so as to construct the insertable and connectable circuit connection structure among the first radiating source pole 111A and the second radiating source pole 112A and the circuit unit 14A, which facilitates the assembling of the microwave-doppler detecting module 10A.

Similarly, the microwave-doppler detecting module 10A further has an electromagnetic reflecting surface 12A provided on the circuit board 13A, wherein the electromagnetic reflecting surface 12A is provided on a side of the circuit board 13A opposite to the other side having the circuit unit 14A thereon, wherein the radiating source pole 111A and the second radiating source pole 112A are arranged spacingly to the electromagnetism reflecting 12A in a space corresponding to the electromagnetic reflecting surface 12A, so as to utilize the electromagnetic wave reflection characteristic of the electromagnetic reflecting surface 12A and the structural relation that the first radiating source pole 111A and the second radiating source pole 112A are arranged spacingly to the electromagnetic reflecting surface 12A in a space corresponding to the electromagnetic reflecting surface 12A to create a directional radiation characteristic of the microwave-doppler detecting module 10A from the electromagnetic reflecting surface 12A toward the directions of the first radiating source pole 111A and the second radiating source pole 112A. In other words, with respect to a sensing direction of the microwave-doppler detecting module 10A defined from the electromagnetic reflecting surface 12A toward the directions of the first radiating source pole 111A and the second radiating source pole 112A, the microwave-doppler detecting module 10A is adapted for detecting and sensing the object activity in the directional space corresponding to the sensing direction. Besides, it also facilitates to avoid the microwave-doppler detecting module from self-activating and avoid the electromagnetic radiation produced from the coupling between the first radiating source pole 111A and the second radiating source pole 112A from interfering the circuit unit 14A provided on the circuit board 13A, so as to enhance the anti-interference ability of the microwave-doppler detecting module.

Especially, based on the adjustment of the positional relation between the medium substrate 18A and the circuit board 13A, the microwave-doppler detecting module 10A may have various structural designs, which facilitates to enhance the applicability of the microwave-doppler detecting module 10A.

Figure 14:
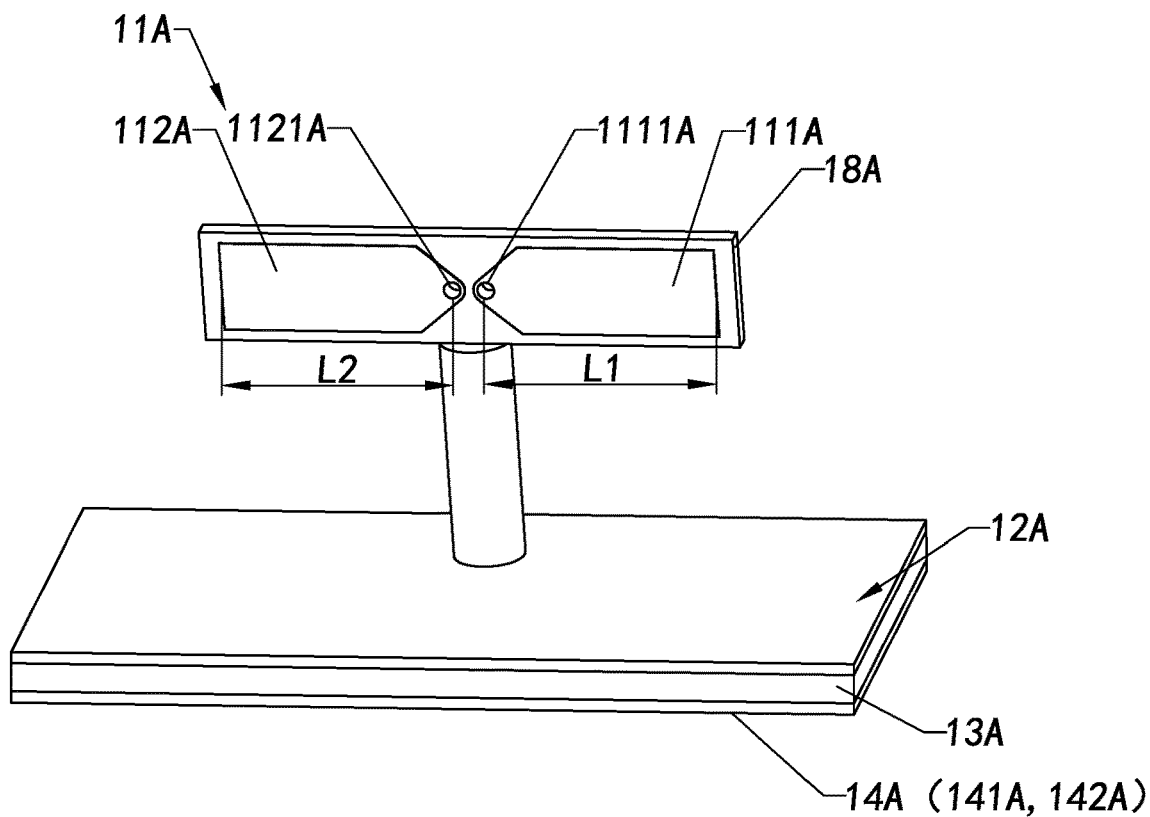
FIG. 14 is a perspective view of the microwave-doppler detecting module according to an alternative mode of the above alternative preferred embodiment of the present invention.

Specifically, referring to FIG. 14 of the drawings of the present invention, based on the adjustment of the positional relation between the medium substrate 18A and the circuit board 13A, the microwave-doppler detecting module 10A according to an alternative mode of the above another preferred embodiment of the present invention is illustrated.

Specifically, according to this alternative mode of the above another preferred embodiment of the present invention, the medium substrate 18A is perpendicular to the circuit board 13A, wherein the connection of the first feed end 1111A and the second feed end 1121A is parallel to the circuit board 13A. In other words, based on the positional relation of the medium substrate 18A parallel to the circuit board 13A, according to this alternative mode, the medium substrate 18A is turned for 90 degrees around the connection of the first feed end 1111A and the second feed end 1121A, which correspondingly creates a positional relation that the medium substrate 18A is perpendicular to the circuit board 13A and that the connection of the first feed end 1111A and the second feed end 1121A is parallel to the circuit board 13A.

It is worth mentioning that, based on the adjustment of the shape of the second radiating source pole 112A and the first radiating source pole 111A, if the second radiating source pole 112A and the first radiating source pole 111A are extended in a manner to the other side of the medium substrate 18A, while the second radiating source pole 112A and the first radiating source pole 111A both satisfy the requirement that the wire lengths from the second feed end 1121A and the first feed end 1111A are respectively greater than or equal to $\lambda/16$, the size of the medium substrate 18A can be reduced so as to the size of the microwave-doppler detecting module 10A.

For instance, according to some embodiments of the present invention, based on the structural relation that the second radiating source pole 112A and the first radiating source pole 111A are symmetrical corresponding to the midpoint of the connection between the first feed end 1111A and the second feed end 1121A and through the adjustment of the shapes of the second radiating source pole 112A and the first radiating source pole 111A, the first radiating source pole 111A and the second radiating source pole 112A can be arranged on the same side of the medium substrate 18A to respectively be extended from the first feed end 1111A and the second feed end 1121A to another side of the medium substrate 18A. In other words, the first feed end 1111A of the first radiating source pole 111A and the second feed end 1121A of the second radiating source pole 112A are provided on the same side of the medium substrate 18A, wherein the first radiating source pole 111A is extended from the first feed end 1111A as one end along a connection direction from the second feed end 1121A toward the first feed end 1111A, and is continuously extended to surround around the edge of the medium substrate 18A to another side of the medium substrate 18A, wherein the second radiating source pole 112A is extended from the second feed end 1121A as one end along a connection direction from the first feed end 1111A toward the second feed end 1121A, and is continually extended to surround around the edge of the medium substrate 18A to another side of the medium substrate 18A.

According to some embodiments of the present invention, the first radiating source pole 111A and the second radiating source pole 112A on different sides of the medium substrate 18A are respectively extended from the first feed end 1111A and the second feed end 1121A to the other sides of the medium substrate 18A. Specifically, the first feed end 1111A of the first radiating source pole 111A and the second feed end 1121A of the second radiating source pole 112A are provided on different sides of the medium substrate 18A, wherein the first radiating source pole 111A from the side of the medium substrate 18A with the first feed end 1111A provided thereon has the first feed end 1111A as an end to be continually extended to surround around the edge of the medium substrate 18A to the side of the medium substrate 18A that provides the second feed end 1121A. In which, the second radiating source pole 112A on the side of the medium substrate 18A having the second feed end 1121A loaded thereon utilizes the second feed end 1121A as an end to be continually extended to surround around the edge of the medium substrate 18A to the side of the medium substrate 18A that has the first feed end 1111A.

It is understandable that, according to some embodiments of the present invention, both sides of the medium substrate 18B are allowed to have at least a pair of the antithetical dipoles 11B be respectively arranged thereon, which can also ensures that the first radiating source pole 111B and the second radiating source pole 112B of each pair of the antithetical dipoles 11B can be antithetically coupled and reinforces the antithetical coupling of the first radiating source pole 111B of the antithetical dipoles 11B provided on one side of the medium substrate 18B and the second radiating source pole 112 of the antithetical dipoles 11B provided on the other side of the medium substrate 18B, wherein the present invention shall not be limited here.

It is worth mentioning that it is understandable that, based on the disclosure of the microwave-doppler detecting module of the above embodiments and their alternative modes: the second radiating source pole corresponding to the first radiating source pole of a pair of the antithetical dipoles may have various and diverse shapes and sizes, rather than be limited in a plant structure of restricted area. In other words, the grounded second radiating source pole is free from the limitation of having a restricted minimum area for reference ground. Instead, the microwave-doppler detecting module is also capable of being utilized in the application scenarios of the above mentioned microwave detection module of columnar radiation source structure through extending the second radiating source pole and the first radiating source pole out of a corresponding metal plate. Further, contrasting to the microwave detection module of columnar radiation source structure, this microwave-doppler detecting module has a better stability in the corresponding application scenarios because the corresponding metal plate will not affect the coupling between the first radiating source pole and the second radiating source pole thereof.

Figure 15:
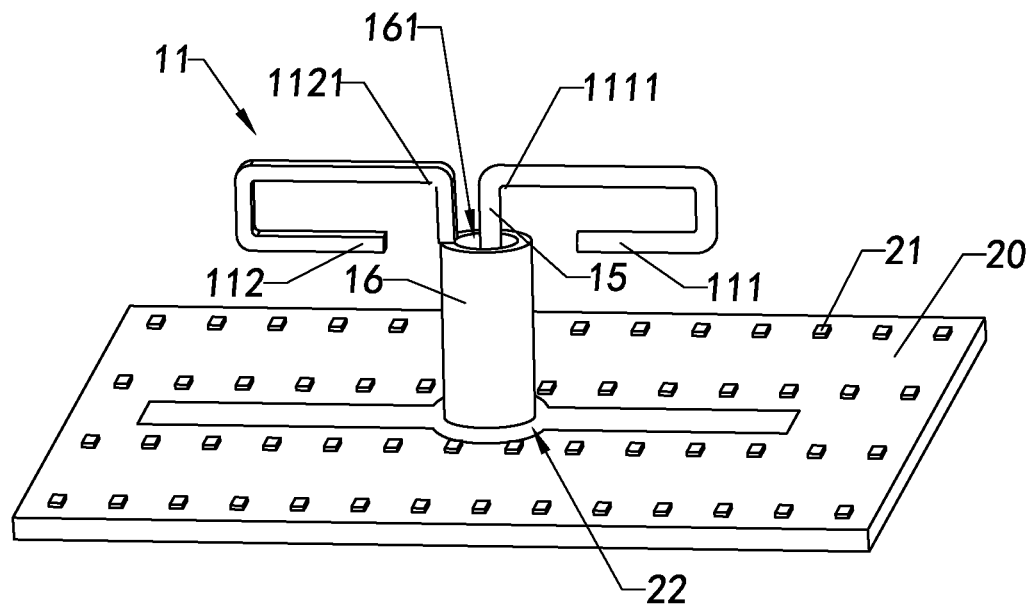
FIG. 15 is a perspective view of a microwave-doppler detecting module having a microwave-doppler detecting device mounted thereon according to another alternative embodiment of the present invention.
Figure 16:
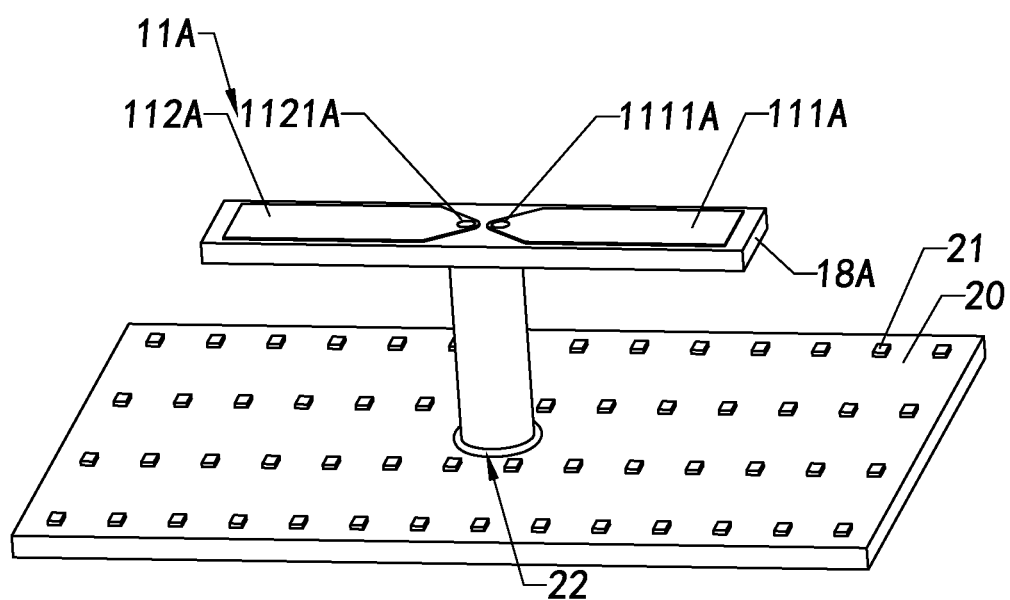
FIG. 16 is a perspective view of a microwave-doppler detecting module having a microwave-doppler detecting device mounted thereon according to another alternative embodiment of the present invention.

For demonstration, referring to FIGS. 15 and 16 of the drawings of the present invention, based on the application of the microwave-doppler detecting module in the scenario of the above mentioned microwave detection module of columnar radiation source structure, the present invention further provides a microwave-doppler detecting device.

Specifically, referencing to FIG. 15, the microwave-doppler detecting module 10 corresponding to FIG. 9 is embodied in the previously mentioned application scenario of the microwave detection module of columnar radiation source structure, wherein the microwave-doppler detecting device comprises the microwave-doppler detecting module 10 and an electromagnetic shielding layer 20, wherein the electromagnetic shielding layer 20 has a through hole, wherein the circuit board 13 is disposed in a shielded space corresponding to a side of the electromagnetic shielding layer 20, wherein the first radiating source pole 111 and the second radiating source pole 112 are disposed in another space corresponding to another side of the electromagnetic shielding layer 20, wherein the first feeder wire 15 and the second feeder wire 16 pass through the electromagnetic shielding layer 20 through the through hole 22 to form and construct the circuit connection structure among the first radiating source pole 111 and the second radiating source pole 112 and the circuit unit 14, so as to utilize the arrangement of the first radiating source pole 111 and the second radiating source pole 112 in a space outside of the shielded space to perform the activity sensing and detecting for the space outside of the shielded space. In which, with respect to the design of the shape of the first radiating source pole and the second radiating source pole 112, the projected area of the first radiating source pole 111 and the second radiating source pole 112 in the direction perpendicular to the electromagnetic shielding layer 20 on the electromagnetic shielding layer 20 can be reduced, which facilitates to reduce the size of the through hole 22, which helps to maintain the completeness of the electromagnetic shielding layer 20 and to enhance the stealth of the mounting of the microwave-doppler detecting module 10 in the microwave-doppler detecting device.

It is understandable that the first radiating source pole 111 and the second radiating source pole 112 are coupled in an antithetical manner, so that when the first radiating source pole 111 and the second radiating source pole 112 are in the space corresponding to the same side of the electromagnetic shielding layer 20, the coupling between the first radiating source pole 111 and the second radiating source pole 112 is capable of avoiding the impediment of the electromagnetic shielding layer 20, so as to facilitate to maintain the detecting stability of the microwave-doppler detecting module mounted in the microwave-doppler detecting device.

Especially, according to one embodiment of the present invention, the electromagnetic shielding layer 20 is configured to be a LED light board and have a plurality of LED lights 21 arranged on the side of the second radiating source pole 112 corresponding to the first radiating source pole 111, wherein based on the shapes of the first radiating source pole 111 and the second radiating source pole 112, the projected area of the first radiating source pole 111 and the second radiating source pole 112 on the electromagnetic shielding layer in the direction perpendicular to the electromagnetic shielding layer 20 can be reduced, so that the size of the through hole 22 can correspondingly be reduced and the microwave-doppler detecting module 10 is allowed to be mounted on the microwave-doppler detecting device through having first radiating source pole 111 and the second radiating source pole 112 pass through, which facilitates the integrity and completeness of the LED light board and facilitates to avoid the LED light board from rendering dark zone.

Corresponding to FIG. 16, the microwave-doppler detecting module 10A as illustrated in FIG. 13 is embodied in the previously mentioned application scenario of the microwave detection module of columnar radiation source structure, wherein the microwave-doppler detecting device comprises the microwave-doppler detecting module and an electromagnetic shielding layer 20A, wherein the electromagnetic shielding layer 20A has a through hole, wherein the circuit board 13A is disposed in a shielded space corresponding to a side of the electromagnetic shielding layer 20A, wherein the first radiating source pole 111A and the second radiating source pole 112A are disposed in another space corresponding to another side of the electromagnetic shielding layer 20A, wherein the first feeder wire 15A and the second feeder wire 16A pass through the electromagnetic shielding layer 20A through the through hole 22A to form and construct the circuit connection structure among the first radiating source pole 111A and the second radiating source pole 112A and the circuit unit 14A, so as to utilize the arrangement of the first radiating source pole 111A and the second radiating source pole 112A in a space outside of the shielded space to perform the activity sensing and detecting for the space outside of the shielded space. In which, with respect to the design of the shape of the first radiating source pole and the second radiating source pole 112A, the projected area of the first radiating source pole 111A and the second radiating source pole 112A in the direction perpendicular to the electromagnetic shielding layer 20A on the electromagnetic shielding layer 20A can be reduced, which facilitates to reduce the size of the through hole 22A, which helps to maintain the completeness of the electromagnetic shielding layer 20A and to enhance the stealth of the mounting of the microwave-doppler detecting module 10A in the microwave-doppler detecting device.

It is worth mentioning that when the second feeder wire 16A and the first feeder wire 15A are configured in a manner that the second feeder wire 16A is a shielding wire surrounding and encircling the first feeder wire 15A and that the shielding wire is insertably arranged in a manner to form a insertable and connectable circuit connection structure among the first radiating source pole 111A and the second radiating source pole 112A and the circuit unit 14A, such as that the shielding wire is configured to be a insertable and connectable structure with the medium substrate 18A or the circuit board 13A so as to form an insertable and connectable circuit connection structure among the first radiating source pole 111A and the second radiating source pole 112A and the circuit unit 14A, the size of the through hole 22A of the electromagnetic shielding layer 20 is allowed to be configured to meet the wire diameter of the shielding wire, which facilitates to reduce the size of the through hole 22A, so as to facilitate to maintain the integrity and completeness of the electromagnetic shielding layer 20A and enhance the stealth of the microwave-doppler detecting module 10A mounted on the microwave-doppler detecting device.

Especially, according to one embodiment of the present invention, the electromagnetic shielding layer 20A is configured to be a LED light board and have a plurality of LED lights 21A arranged on the side of the second radiating source pole 112A corresponding to the first radiating source pole 111A, wherein based on the shape of the first radiating source pole 111A and the second radiating source pole 112A, the projected area of the first radiating source pole 111A and the second radiating source pole 112A on the electromagnetic shielding layer in the direction perpendicular to the electromagnetic shielding layer 20A can be reduced, so as to facilitate to avoid the LED light board from rendering dark zone.

It is understandable that based on the electromagnetic wave reflection characteristic of the electromagnetic shielding layer 20A, the electromagnetic reflecting surface 12A can be equivalently formed on the electromagnetic shielding layer 20A. In other words, the electromagnetic reflecting surface 12A corresponding formed on the circuit board 13A may be omitted. In other words, according to one embodiment of the present invention, the electromagnetic reflecting surface 12A corresponding formed on the circuit board 13A shall not be a limitation to the microwave-doppler detecting device of the present invention.

It is worth mentioning that the above embodiments and alternative modes thereof are only examples, based on an antithetical coupling manner, the microwave-doppler detecting module comprises at least a pair of the antithetical dipoles, wherein the shapes and sizes of the first radiating source pole and the second radiating source pole of each pair of the antithetical dipoles may vary and the first radiating source pole and the second radiating source pole in the shielded space corresponding to a side of the electromagnetic shielding layer may extend through the through hole to a space out of the shielded space corresponding to the other side of the electromagnetic shielding layer, so as for achieving the installation of the microwave-doppler detecting module on the corresponding microwave-doppler detecting device, for achieving the activity detecting outside of the shielded space through breaking through the shielded space, and for maintaining the integrity and completeness of the electromagnetic shielding layer. It not only benefits the stealth of the installation of the microwave-doppler detecting module on the microwave-doppler detecting device, but also achieves detection to the space outside of the shielded space without blind angle. It is understandable that the electromagnetic shielding layer of the microwave-doppler detecting device is not limited to be embodied to be a LED light board. The understanding to the electromagnetic shielding layer shall be as a functional layer with an electromagnetism shielding function, which includes, but not limited to a metal (net) layer, compound layer with metal component, metal oxide layer, and etc. Hence, the electromagnetic shielding layer may also be embodied to be a device case with an electromagnetism shielding function, such as a lamp shell, an air conditioner shell, an elevator cargo, and etc.

One skilled in the art should be able to understand that the above embodiments are just examples, which shall not limit the present invention. Therefore, features of various embodiments may also be interchanged and combined in order to easily come out and achieve other implementations that the drawings of the present invention have not specified based on the disclosed contents of the present invention. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microwave-doppler detecting module for radiating an electromagnetic wave for detecting an object activity in a directional space, comprising:

a first radiating source pole configured to be a conductive wire having a first feed end and a second radiating source pole configured to be a conductive wire having a second feed end, wherein said first radiating source pole, from said first feed end along said first radiating source pole, is correspondingly coupled with corresponding positions of said second radiating source pole, from said second feed end along said second radiating source pole, to form a radiation space which is a coverage area of the electromagnetic wave radiated by said microwave-doppler detecting module and is formed protruding in a radial direction of a connection of said first feed end and said second feed end to avoid a detection dead zone in said radial direction, wherein said first radiating source pole and said second radiating source pole are adapted for being fed by an excitation signal feed source at said first feed end and said second feed end respectively, wherein said first radiating source pole is configured to satisfy to have a wire length greater than or equal to $\lambda/16$ from said first feed end and said second radiating source pole is configured to satisfy to have a wire length greater than or equal to $\lambda/16$ from said second feed end; and an electromagnetic reflecting surface, wherein said first radiating source pole and said second radiating source pole are arranged spacingly to said electromagnetic reflecting surface in the directional space corresponding to said electromagnetic reflecting surface such that said microwave-doppler detecting module is adapted for detecting the object activity in the directional space, wherein a reflection of a radiation of the electromagnetic wave from said first radiating source pole and said second radiation source pole toward said electromagnetic reflecting surface at a radiation direction corresponding to the radial direction of the connection of said first feed end and said second feed end to construct a sensing direction of said microwave-doppler detecting module from said electromagnetic reflecting surface toward said first radiating source pole and said second radiating source pole to enhance the radiation of the electromagnetic wave in the sensing direction to enhance a directional range of said microwave-doppler detecting module.

2. The microwave-doppler detecting module, as recited in claim 1, wherein λ is a wavelength parameter corresponding of a feed signal frequency of said excitation signal feed source, wherein a wire length parameter L1 defined on said first radiating source pole between said first feed end and said first end opposite to said first feed end satisfies $\lambda/16 \leq L1 \leq \lambda$ and a wire length parameter L2 of said second radiating source pole defined between said second feed end and said second end opposite to said second feed end satisfies $\lambda/16 \leq L2 \leq \lambda$, such that when said second radiating source pole is grounded at said second feed end as one end thereof and said first radiating source pole is fed as said first feed end as another end thereof, wherein said first radiating source pole and said second radiating source pole are configured to provide an antithetical coupling manner that said first radiating source pole and said second radiating source pole have the same size and shape and are symmetrically coupled with each other.

3. The microwave-doppler detecting module, as recited in claim 2, wherein said first radiating source pole is disposed to be a conductor extended from said first feed end as an end thereof, wherein said second radiating source pole is disposed to be a conductor extended from said second feed end as an end thereof.

4. The microwave-doppler detecting module, as recited in claim 3, wherein said first feed end and said second feed end approach each other within a range smaller than or equal to $\lambda/32$, wherein said first radiating source pole is configured to satisfy to have the wire length greater than or equal to $\lambda/16$ from said first feed end, wherein said second radiating source pole is configured to satisfy to have the wire length greater than or equal to $\lambda/16$ from said second feed end, so as to allow a current and potential distribution of said first radiating source pole and said second radiating source pole to be presented in an antithetical distribution state to a midpoint of a connection of said first feed end and said second feed end when said first radiating source pole and said second radiating source pole are fed by a same excitation signal feed source at said first feed end and said second feed end respectively, so as to correspondingly couple said first radiating source pole from said first feed end along said first radiating source pole with corresponding positions of said second radiating source pole from said second feed end along said second radiating source pole.

5. The microwave-doppler detecting module, as recited in claim 2, wherein said first feed end and said second feed end approach each other within a range smaller than or equal to $\lambda/32$, wherein said first radiating source pole is configured to satisfy to have the wire length greater than or equal to $\lambda/16$ from said first feed end, wherein said second radiating source pole is configured to satisfy to have the wire length greater than or equal to $\lambda/16$ from said second feed end, so as to allow a current and potential distribution of said first radiating source pole and said second radiating source pole to be presented in an antithetical distribution state to a midpoint of a connection of said first feed end and said second feed end when said first radiating source pole and said second radiating source pole are fed by a same excitation signal feed source at said first feed end and said second feed end respectively, so as to correspondingly couple said first radiating source pole from said first feed end along said first radiating source pole with corresponding positions of said second radiating source pole from said second feed end along said second radiating source pole.

6. The microwave-doppler detecting module, as recited in claim 1, wherein said first radiating source pole is disposed to be a conductor extended from said first feed end as an end thereof, wherein said second radiating source pole is disposed to be a conductor extended from said second feed end as an end thereof.

7. The microwave-doppler detecting module, as recited in claim 1, further comprising a circuit unit which comprises an oscillation circuit module and a frequency mixing wave detection unit, wherein said frequency mixing wave detection unit is electrically coupled with said oscillation circuit module and said first and second radiating source poles, wherein said oscillation circuit module is configured to allow being powered to output a feed signal from a feeder pole thereof and to ground a grounding pole as said excitation signal feed source, wherein said first radiating source pole is electrically coupled with said feeder pole of said oscillation circuit module at said first feed end, wherein said second radiating source pole is electrically connected with said grounding pole of said oscillation circuit module at said second feed end, such that when said oscillation circuit module is powered, said first radiating source pole and said second radiating source pole are fed by the same source of said oscillation circuit module respectively at said first feed end and said second feed end.

8. The microwave-doppler detecting module, as recited in claim 7, further comprising a circuit board, wherein said electromagnetic reflecting surface and said circuit unit are provided on said circuit board on an opposite side of said circuit board respectively to correspondingly create a condition that said electromagnetic reflecting surface obstructs between said first and second radiating source poles and said circuit unit.

9. The microwave-doppler detecting module, as recited in claim 8, further comprising a first feeder wire and a second feeder wire, wherein said first radiating source pole is electrically coupled with said feeder pole of said oscillation circuit module at said first feed end through said first feeder wire, wherein said second radiating source pole is electrically connected with said grounding pole of said oscillation circuit module at said second feed end through said second feeder wire.

10. The microwave-doppler detecting module, as recited in claim 9, wherein said first feeder wire and said second feeder wire are columnar straight conductive wires parallel to each other.

11. The microwave-doppler detecting module, as recited in claim 9, wherein said first feeder wire has a first feeder section and a first coupling section integrally extended from said first feeder section in a direction deviating from said first feeder section, wherein said second feeder wire has a second feeder section and a second coupling section integrally extended from said second feeder section in a direction deviating from said second feeder section, wherein said first feeder section and said second feeder section are columnar straight conductive wires parallel to each other and are respectively extended from said first feed end and said second feed end.

12. The microwave-doppler detecting module, as recited in claim 11, wherein said first feeder section is electrically coupled with said oscillation circuit module and affixedly coupled with said circuit board through said first coupling section, wherein said second feeder section is electrically coupled with an earth potential of said oscillation circuit module and affixedly coupled with said circuit board through said second coupling section.

13. The microwave-doppler detecting module, as recited in claim 12, wherein said first coupling section and said second coupling section respectively integrally extended from said first feeder section and said second feeder section away from each other, so that a distance between said first coupling section and said second coupling section in the directions perpendicular to said first feeder section and said second feeder section is larger than a distance between said first feeder section and said second feeder section.

14. A microwave-doppler detecting device for radiating an electromagnetic wave for detecting an object activity in a directional space, comprising:
- a circuit unit, which comprises an oscillation circuit module and a frequency mixing wave detection unit, wherein said oscillation circuit module is configured for being powered to output a feed signal from a feeder pole thereof and being grounded at a grounding pole thereof as an excitation signal feed source;
- a circuit board, wherein said circuit unit is provided on said circuit board;
- an electromagnetic shielding layer having a through hole, wherein said circuit unit is arranged in a space corresponding to a side of said electromagnetic shielding layer; and
- a first radiating source pole and a second radiating source pole which are disposed in a space corresponding to another side of said electromagnetic shielding layer, wherein said first radiating source pole is configured to be a conductive wire having a first feed end and said second radiating source pole is configured to be a conductive wire having a second feed end, wherein said frequency mixing wave detection unit is electrically coupled with said oscillation circuit module and said first and second radiating source poles, wherein said first radiating source pole from said first feed end along said first radiating source pole is correspondingly coupled with corresponding positions of said second radiating source pole from said second feed end along said second radiating source pole to form a radiation space which is a coverage area of the electromagnetic wave radiated by said microwave-doppler detecting module and is formed protruding in a radial direction of a connection of said first feed end and said second feed end to avoid a detection dead zone in said radial direction, wherein said first radiating source pole is configured to satisfy to have a wire length greater than or equal to $\lambda/16$ from said first feed end and said second radiating source pole is configured to satisfy to have a wire length greater than or equal to $\lambda/16$ from said second feed end.

15. The microwave-doppler detecting device, as recited in claim 14, wherein said first radiating source pole and said second radiating source pole are adapted for being fed by an excitation signal feed source at said first feed end and said second feed end respectively.

16. The microwave-doppler detecting device, as recited in claim 15, wherein said first radiating source pole is electrically coupled with said feeder pole of said oscillation circuit module through a first feeder wire penetrating said electromagnetic shielding layer through said through hole at said first feed end, wherein said second radiating source pole is electrically connected with said grounding pole of said oscillation circuit module through a second feeder wire penetrating said electromagnetic shielding layer through said through hole at said second feed end.

17. The microwave-doppler detecting device, as recited in claim 16, wherein said first radiating source pole and said second radiating source pole are configured to provide an antithetical coupling manner that said first radiating source pole and said second radiating source pole have the same size and shape and are symmetrically coupled with each other, wherein said first feed end and said second feed end approach each other within a range smaller than or equal to $\lambda/32$, wherein $\lambda$ is a wavelength parameter corresponding to a frequency of the feed signal, wherein said first radiating source pole configured to have said wire length greater than or equal to $\lambda/16$ from said first feed end and said second radiating source pole configured to have said wire length greater than or equal to $\lambda/16$ from said second feed end are adapted to allow a potential distribution of said first radiating source pole and said second radiating source pole to present an antithetical distribution state to a midpoint of a connection of said first feed end and said second feed end, so as to correspondingly couple said first radiating source pole from said first feed end along said first radiating source pole with corresponding positions of said second radiating source pole from said second feed end along said second radiating source pole.

18. The microwave-doppler detecting device, as recited in claim 14, wherein said first radiating source pole is electrically coupled with said feeder pole of said oscillation circuit module through a first feeder wire penetrating said electromagnetic shielding layer through said through hole at said first feed end, wherein said second radiating source pole is electrically connected with said grounding pole of said oscillation circuit module through a second feeder wire penetrating said electromagnetic shielding layer through said through hole at said second feed end.

19. The microwave-doppler detecting device, as recited in claim 18, wherein said first radiating source pole and said second radiating source pole are configured to provide an antithetical coupling manner that said first radiating source pole and said second radiating source pole have the same size and shape and are symmetrically coupled with each other, wherein said first feed end and said second feed end approach each other within a range smaller than or equal to $\lambda/32$, wherein $\lambda$ is a wavelength parameter corresponding to a frequency of the feed signal, wherein said first radiating source pole configured to have said wire length greater than or equal to $\lambda/16$ from said first feed end and said second radiating source pole configured to have said wire length greater than or equal to $\lambda/16$ from said second feed end are adapted to allow a potential distribution of said first radiating source pole and said second radiating source pole to present an antithetical distribution state to a midpoint of a connection of said first feed end and said second feed end, so as to correspondingly couple said first radiating source pole from said first feed end along said first radiating source pole with corresponding positions of said second radiating source pole from said second feed end along said second radiating source pole.

20. The microwave-doppler detecting device, as recited in claim 14, wherein said first radiating source pole and said second radiating source pole are configured to provide an antithetical coupling manner that said first radiating source pole and said second radiating source pole have the same size and shape and are symmetrically coupled with each other, wherein said first feed end and said second feed end approach each other within a range smaller than or equal to $\lambda/32$, wherein $\lambda$ is a wavelength parameter corresponding to a frequency of the feed signal, wherein said first radiating source pole configured to have said wire length greater than or equal to $\lambda/16$ from said first feed end and said second radiating source pole configured to have said wire length greater than or equal to $\lambda/16$ from said second feed end are adapted to allow a potential distribution of said first radiating source pole and said second radiating source pole to present an antithetical distribution state to a midpoint of a connection of said first feed end and said second feed end, so as to correspondingly couple said first radiating source pole from said first feed end along said first radiating source pole with corresponding positions of said second radiating source pole from said second feed end along said second radiating source pole.

\* \* \* \* \*